(12) United States Patent
McAndrews

(10) Patent No.: US 7,552,935 B2
(45) Date of Patent: Jun. 30, 2009

(54) INTEGRATED BICYCLE SHIFTING AND SUSPENSION SYSTEM

(75) Inventor: Mike McAndrews, Capitola, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 233 days.

(21) Appl. No.: 11/527,772

(22) Filed: Sep. 26, 2006

(65) Prior Publication Data

US 2007/0096426 A1    May 3, 2007

Related U.S. Application Data

(60) Provisional application No. 60/720,964, filed on Sep. 26, 2005, provisional application No. 60/720,852, filed on Sep. 26, 2005.

(51) Int. Cl.
*B62K 3/00* (2006.01)
(52) U.S. Cl. ........................ 280/283; 280/260
(58) Field of Classification Search .............. 280/283, 280/260, 259, 5.512, 5.515
See application file for complete search history.

(56) References Cited

U.S. PATENT DOCUMENTS

| | | | |
|---|---|---|---|
| 4,997,197 | A | 3/1991 | Shultz |
| 5,320,375 | A | 6/1994 | Reeves et al. |
| 5,810,453 | A | 9/1998 | O'Brien |
| 5,909,890 | A | 6/1999 | Sachs et al. |
| 6,045,470 | A * | 4/2000 | Wilcox et al. ................. 474/78 |
| 6,050,583 | A | 4/2000 | Bohn |
| 6,244,667 | B1 | 6/2001 | Dietrich |
| 6,543,799 | B2 | 4/2003 | Miyoshi |
| 6,595,537 | B2 | 7/2003 | Miyoshi |
| 6,612,599 | B2 | 9/2003 | Miyoshi |
| 6,619,684 | B2 | 9/2003 | Miyoshi |
| 6,734,376 | B2 | 5/2004 | Ichida et al. |
| 6,767,024 | B1 | 7/2004 | Kuo |
| 6,767,308 | B2 * | 7/2004 | Kitamura ....................... 477/7 |
| 6,834,877 | B2 * | 12/2004 | Lesage et al. ............... 280/284 |
| 6,835,069 | B2 | 12/2004 | Kitamura et al. |
| 6,863,291 | B2 | 3/2005 | Miyoshi |

(Continued)

FOREIGN PATENT DOCUMENTS

EP    0 814 015    12/1997

(Continued)

OTHER PUBLICATIONS

International Search Report for Application No. PCT-US2006/037270 (the PCT counterpart of the parent application) mailed Jan. 18, 2007.

*Primary Examiner*—Paul N Dickson
*Assistant Examiner*—Tashiana Adams
(74) *Attorney, Agent, or Firm*—Knobbe, Martens, Olson & Bear, LLP

(57) ABSTRACT

An integrated shifting and suspension system for a bicycle coordinates suspension settings with gear selections. A mechanical cable linkage between a derailleur and an adjustable shock absorber couples the shifting and suspension settings of a bicycle. This coupling automatically adjusts the suspension to a firm setting when a rider selects a low gear and a soft setting when a rider selects a high gear. Movement of the derailleur corresponding to a gear selection moves the cable, thus actuating a firmness control mechanism on the shock absorber. Various interconnections, including those linking front or rear derailleurs to front or rear suspensions are possible with the integrated systems described herein.

25 Claims, 22 Drawing Sheets

U.S. PATENT DOCUMENTS

| | | |
|---|---|---|
| 6,880,847 B2 * | 4/2005 | Chamberlain et al. ....... 280/284 |
| 7,059,620 B2 * | 6/2006 | Chamberlain et al. ....... 280/284 |
| 7,350,787 B2 | 4/2008 | Voss |
| 7,377,535 B2 * | 5/2008 | Chamberlain ............... 280/284 |
| 2002/0128106 A1 | 9/2002 | Kitamura |
| 2003/0094784 A1 * | 5/2003 | Miyoshi ..................... 280/284 |
| 2004/0114407 A1 | 6/2004 | Kitamura et al. |
| 2005/0023094 A1 | 2/2005 | McAndrews |
| 2005/0029772 A1 | 2/2005 | Oi |
| 2007/0001424 A1 * | 1/2007 | Chamberlain ............... 280/283 |

FOREIGN PATENT DOCUMENTS

| | | |
|---|---|---|
| EP | 1 122 091 | 8/2001 |
| EP | 1 241 087 A1 | 9/2002 |
| EP | 1 529 724 A | 5/2005 |
| EP | 1 541 862 A2 | 6/2005 |
| GB | 2 280 879 A | 2/1995 |
| WO | WO 96/09203 | 3/1996 |

* cited by examiner

INTEGRATED BICYCLE SHIFTING AND SUSPENSION SYSTEM

CROSS-REFERENCE TO RELATED APPLICATIONS

This application claims the benefit of U.S. Provisional Patent Application No. 60/720,964, entitled "INTEGRATED BICYCLE SHIFTING AND SUSPENSION SYSTEM," filed on Sep. 26, 2005; and U.S. Provisional Patent Application No. 60/720,852, entitled "INTEGRATED BICYCLE SHIFTING AND SUSPENSION SYSTEM," filed on Sep. 26, 2005.

Also, this application hereby incorporates by reference the above-identified provisional applications, in their entirety.

BACKGROUND OF THE INVENTION

1. Field of the Invention

This system relates generally to bicycle suspension controls, and more specifically, this system relates to automatically interconnecting a bicycle suspension damping setting with a bicycle shifting setting 2. Description of the Related Art Bicycles intended for off-road use, i.e., mountain bikes, commonly include a suspension assembly operably positioned between the front and/or rear wheels of the bicycle and the frame of the bicycle. The suspension assembly typically includes a shock absorber configured to absorb forces imparted to the bicycle by bumps or other irregularities of the surface on which the bicycle is being ridden. However, an undesirable consequence of incorporating a suspension assembly in a bicycle is the tendency for the shock absorber to absorb a portion of the power output of a rider of the bicycle. In some instances, i.e. when the rider is standing, the proportion of power absorbed by the shock absorber may be substantial and may drastically reduce the efficiency of the bicycle.

Numerous attempts have been made to overcome the inefficiencies related to the use of shock absorbers in connection with mountain bikes. For example, suspension may be provided only between the front wheel and the frame of the bicycle (referred to as a "hardtail" bicycle), to take advantage of the improved handling provided by the suspension while minimizing power loss by rigidly supporting the rear wheel. However, such an arrangement reduces comfort and more importantly control for the rider.

Another proposed solution is to configure the shock absorber to differentiate forces induced by the terrain and forces induced by the rider so that terrain-induced forces may be absorbed, while the absorption of rider-induced forces is reduced or substantially eliminated. One example of this type of shock absorber utilizes an inertia valve to distinguish rider-induced forces from terrain-induced forces and is described in U.S. Pat. No. 6,267,400, which is assigned to the assignee of the present invention. In one exemplary embodiment described therein, a shock absorber includes a compression fluid chamber and a reservoir fluid chamber configured for fluid communication with the compression fluid chamber. During compression motion of the shock absorber, fluid is transferred from the compression fluid chamber to the reservoir fluid chamber, which operates as a compensation chamber for fluid displaced by a shaft of the shock absorber during compression movement, as will be readily appreciated by one of skill in the art. In an illustrated embodiment of U.S. Pat. No. 6,267,400, an inertia valve is positioned between the compression fluid chamber and the reservoir fluid chamber and regulates the flow of fluid in a direction from the compression fluid chamber to the reservoir fluid chamber.

In one exemplary embodiment of the inertia valve, an inertia mass is configured to substantially prevent fluid flow to the reservoir chamber in response to a rider-induced force. Accordingly, because fluid flow from the compression fluid chamber to the reservoir fluid chamber is substantially prevented, compression movement of the shock absorber is substantially prevented because the fluid displaced by the shaft cannot be transferred to the reservoir fluid chamber. In this mode, a bicycle incorporating the shock absorber behaves in a manner similar to a hardtail. The inertia mass is further configured to permit fluid flow to the reservoir in response to a terrain-induced force above a threshold. In this mode, compression movement of the shock absorber is permitted because the fluid displaced by the shaft may be transferred to the reservoir chamber. Thus, in this mode, the bicycle obtains the benefit of rear suspension in absorbing terrain-induced forces.

An exemplary embodiment of U.S. Pat. No. 6,267,400 described immediately above provides numerous benefits when incorporated into the front or rear suspension assembly of a bicycle. Mountain bikes equipped with such shock absorbers are especially well-suited for competitive use, where a high pedaling efficiency is particularly advantageous. In addition, the availability of suspension travel in response to terrain-induced forces allows such a mountain bike to traverse rough terrain more quickly than a "hardtail" bicycle.

Bicycle shock absorbers having rider-adjustable compression and rebound damping characteristics have been used to match a desired level of pedaling efficiency and ride comfort with a type of terrain encountered. A rider may adjust the compression damping setting of a shock absorber to trade improved pedaling efficiency for improved bump absorption. For example, an adjustable shock absorber may desirably be set to a firm setting while a rider is on a steep hill climb to increase the amount of pedaling energy reaching the driven wheel and reduce the amount of pedaling energy dissipated by the suspension. Conversely, an adjustable shock absorber may desirably be set to a relatively soft compression damping setting where a rider is traveling fast downhill.

Conventional adjustable shock absorbers used in bicycle suspensions are lever actuated to allow a rider to adjust the shock setting on the fly. Commonly shock absorbers have three compression damping firmness settings: a firm setting, a medium damping setting, and a soft setting. Often, the adjustment levers are difficult for a rider to reach while cycling. Various mechanically coupled hand controls have been proposed for overcoming this lack of access to suspension adjustments. However, an additional hand control has the unintended effect of overwhelming an already busy cyclist who typically coordinates four hand controls (two shifters controls and two brake controls) during strenuous maneuvers. This potential for overwhelming a cyclist is exacerbated by the fact that when a rider encounters a steep incline or decline, they may want to modulate the brakes, shift gears, and adjust the suspension settings almost simultaneously. Moreover, less experienced riders may want the versatility offered by an easily adjustable suspension, but not be aware of the optimal suspension settings for commonly encountered riding conditions.

Conventional transmissions for bicycles include a chain transmitting pedal power from a front gear set to a rear gear set. Commonly, the front gear set includes three chain rings. A rider can shift the chain from chain ring to chain ring by selecting a gear on the derailleur. The front derailleur is a robust, almost maintenance-free mechanism that even novice riders are familiar with operating. Moreover, the position of the front derailleur often corresponds to the terrain or topography encountered by a rider. For example a small chain ring is typically chosen for particularly steep hills where a low gear is desired to increase pedaling leverage, a middle chain ring is for more moderate hills, and a large chain ring is chosen for high speed cruising or downhill descents.

SUMMARY OF THE INVENTION

For more general mountain biking use, however, an illustrated embodiment of U.S. Pat. No. 6,267,400 could be further improved. For example, one characteristic of the above-described shock absorber is that it tends to assume a fully extended position when the inertia valve is preventing fluid flow to the reservoir fluid chamber, i.e., when the inertia valve has not been activated by a terrain-induced force above the threshold force. A typical shock absorber (without an inertia valve) assumes a more intermediate position within its range of travel in the absence of moderately large pedaling or terrain-induced forces. This intermediate position is referred to as the "sag position" of the shock absorber. Thus, the tendency of the illustrated shock absorbers of U.S. Pat. No. 6,267,400 is to assume a fully extend position, or topped-out position and may alter the handling characteristics of an associated bicycle, especially when the bicycle frame geometry is not specifically designed for such a shock absorber.

In addition, when compression travel of the shock absorber is permitted, the shock absorber will compress a greater amount than a conventional shock absorber (i.e., an amount of compression due to the bump plus the amount of compression equal to the initial "sag" of a conventional shock), which may be noticeable to a rider of the bicycle. Further, because the shock absorber is normally in a topped-out position, it may not be able to extend in the event that the surface upon which the bicycle is being ridden suddenly drops away from the bicycle wheel, such as in the situation of the bicycle encountering a drop-off or depression.

Accordingly, a need exists for a shock absorber configured to provide a desirable level of pedaling efficiency, while offering at least some amount of "sag". That is, preferably, the shock absorber does not normally assume a fully extended, or topped out, position when a rider's weight is applied to the bicycle. Preferred embodiments of the present position sensitive shock absorber allow the shock absorber to move to a sag position, despite the inertia valve not being activated, to provide a desired ride height of the bicycle. In addition, preferably, the shock absorber becomes locked-out, or substantially locked-out, once the sag position is achieved by, for example, substantially preventing fluid flow in a compression direction within the shock absorber until the inertia valve is activated by an appropriate acceleration force. This feature is especially advantageous when the shock absorber is used with bicycles having relatively longer wheel suspension displacement, or "travel", because the sag constitutes a larger proportion of the overall travel and is thus more easily noticed by the rider. The greater sag distance also changes other related geometries of the bicycle such as head tube angle and seat tube angle to a greater degree than that of relatively shorter travel bicycles. Thus, the benefits of the preferred position sensitive shock absorber system become more pronounced as the suspension travel increases. Furthermore, preferred embodiments of the position sensitive valve may be incorporated within suspension assemblies that do not include an acceleration sensitive inertia valve, but utilize pressure activated valves, or other mechanisms for creating a damping force.

A preferred embodiment is a suspension damper including a piston rod carrying a piston and a tube defining a piston chamber. The piston is configured for reciprocal movement within the piston chamber. A reservoir chamber is defined by the damper and includes a divider configured to move to vary a volume of the reservoir chamber to accommodate fluid displaced from the piston chamber by the piston rod. The suspension damper also includes a fluid passage connecting the piston chamber and the reservoir chamber and a valve having a first position and a second position. The valve preferably permits a first rate of fluid flow through the flow passage in the first position and the valve permits a second rate of fluid flow through the flow passage in the second position. Movement of the divider moves the valve between the first and second position.

Yet another preferred embodiment is a suspension damper including a tube and a piston rod carrying a piston for reciprocal movement within the tube. The piston and the tube define a first fluid chamber. A second fluid chamber is defined by the damper. The suspension damper also includes a first valve configured to move between a first position and a second position in response to an increase in the volume of fluid within the second chamber and a second valve configured to move between a first position and a second position in response to an acceleration force applied to the damper.

Still another preferred embodiment is a suspension damper including a tube and a piston rod carrying a piston for reciprocal movement within the tube. The damper also includes a first valve, normally biased to an open position, and configured to permit the damper to move from a substantially fully extended position to a sag position that is between about 5% and 40% of the total compression travel of the damper. The valve moves to a closed position to maintain the damper at the sag position. The damper also includes a second valve, normally biased to a closed position, configured to permit the damper to move from the sag position to a further compressed position.

Additionally, integrated suspension and shifting systems for bicycles are disclosed herein that overcome the shortcomings of the prior art. More specifically, integrated shifting systems interconnect the shifting of a bicycle with its suspension such that when a relatively low gear is selected, the suspension can be adjusted to a relatively stiff setting. Likewise, when a relatively high gear is selected, the suspension can be adjusted to a relatively soft setting.

In certain embodiments, a bicycle suspension control system comprising a derailleur configured to be coupled to a chain drive assembly of a bicycle, and a suspension is provided. The suspension is configured to be connected to first and second parts of the bicycle. The suspension is selectively controllable. Movement of the derailleur causes adjustment of the suspension such that when the derailleur is in a position corresponding to a low gear on the chain drive assembly, the suspension is adjusted to a first configuration. When the derailleur is in a position corresponding to a high gear on the chain drive assembly, the suspension is adjusted to a second configuration.

In still other embodiments, a bicycle suspension control system comprising a cable having a first end and a second end is provided. The first end of the cable is configured to be coupled to a derailleur of a bicycle having a chain drive assembly such that varying a gear selection of the derailleur varies the position of the first end of the cable. The second end of the cable is configured to be coupled to an adjustable suspension such that varying the position of the second end of the cable adjusts the adjustable suspension.

In other embodiments, a bicycle attitude control system is provided comprising at least one of a derailleur and a gear shifting mechanism and a suspension. The gear shifting mechanism is configured to be coupled to a chain drive assembly of a bicycle. The suspension is configured to be connected to first and second parts of the bicycle. The suspension has a selectively controllable travel corresponding to an attitude of the bicycle. wherein the at least one of a derailleur and a gear shifting mechanism is operatively coupled to the suspension such that when the at least one of a derailleur and a gear shifting mechanism is in a position corresponding to a low gear on the chain drive assembly, the suspension is adjusted such that the bicycle is at a first attitude and when the at least one of a derailleur and a gear shifting mechanism is in a position corresponding to a high gear on the chain drive assembly, the suspension is adjusted such that the bicycle is at a second attitude.

In other embodiments, a bicycle suspension control system is disclosed comprising a brake control and a suspension. The brake control is configured to be coupled to a brake mechanism of a bicycle. The suspension is configured to be connected to first and second parts of the bicycle. The suspension is selectively controllable. The brake control is operatively coupled to the suspension such that when the brake control is in a position corresponding to a disengaged position of the brake mechanism, the suspension is adjusted to a first configuration and when the brake control is in a position corresponding to an engaged position of the brake mechanism, the suspension is adjusted to a second configuration.

In other embodiments, a bicycle attitude control system is disclosed comprising a derailleur and a suspension. The derailleur is configured to be coupled to a chain drive assembly of a bicycle. The suspension is configured to be connected to first and second parts of the bicycle. The suspension has a selectively controllable travel corresponding to an attitude of the bicycle. The derailleur is electronically coupled to the suspension such that when the derailleur is in a position corresponding to a low gear on the chain drive assembly, the suspension is adjusted such that the bicycle is at a first attitude and when the derailleur is in a position corresponding to a high gear on the chain drive assembly, the suspension is adjusted such that the bicycle is at a second attitude.

In other embodiments, a bicycle suspension control system is disclosed comprising a brake control and a suspension. The brake control is configured to be coupled to a brake mechanism of a bicycle. The suspension is configured to be connected to first and second parts of the bicycle. The suspension has a selectively controllable firmness. The brake control is electronically coupled to the suspension such that when the brake control is in a position corresponding to a disengaged position of the brake mechanism, the suspension is adjusted to a first level of firmness and when the brake control is in a position corresponding to an engaged position of the brake mechanism, the suspension is adjusted to a second level of firmness.

BRIEF DESCRIPTION OF THE DRAWINGS

These and other features, aspects and advantages of the present bicycle shock absorber are described below with reference to drawings of preferred embodiments, which are intended to illustrate, but not to limit, the present invention. The drawings contain twenty-five (25) figures.

FIG. 22b depicts a cut-away perspective view of the valve of FIG. 22a;

DETAILED DESCRIPTION OF THE PREFERRED EMBODIMENT

Figure 1:
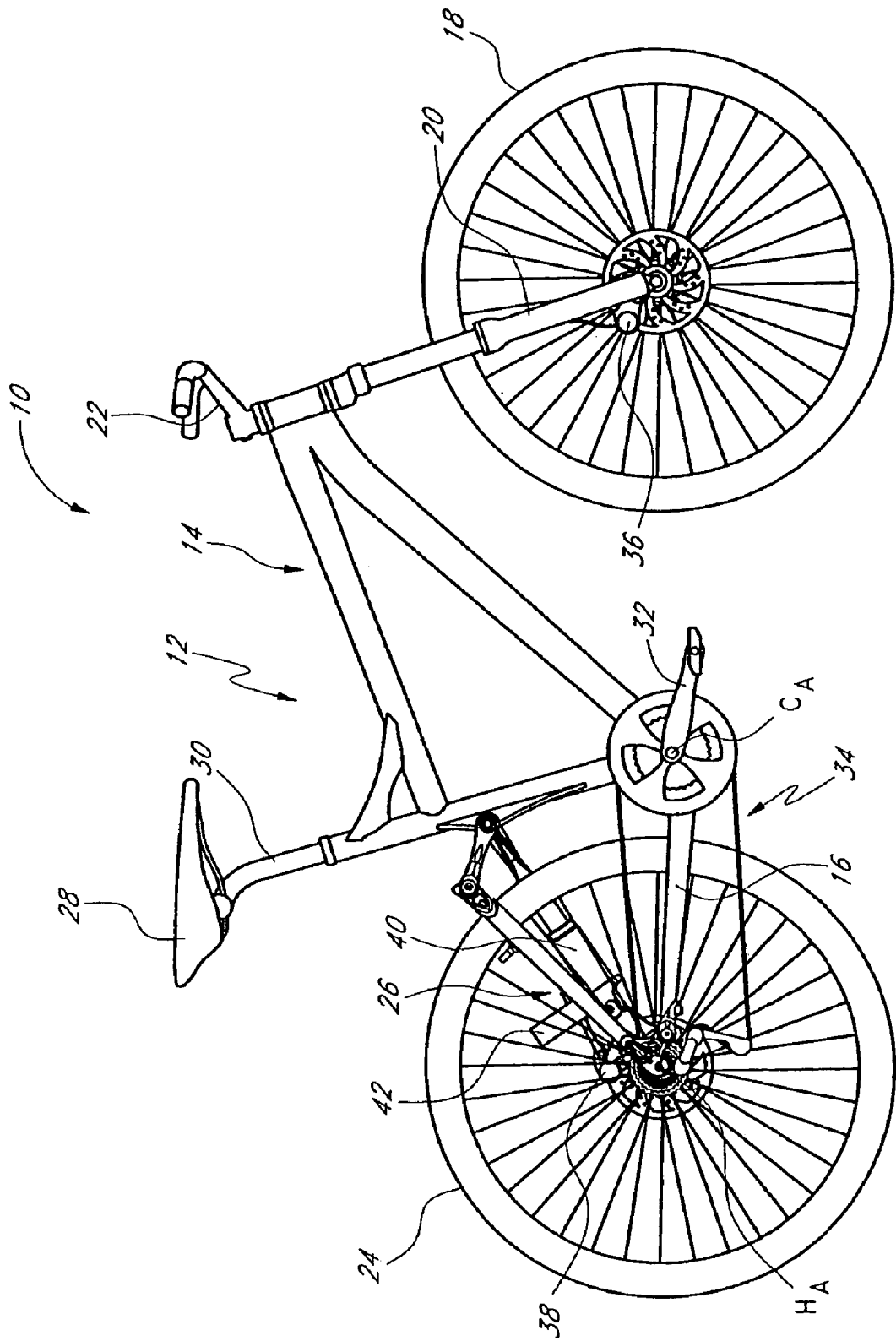
FIG. 1 is an illustration of an off-road bicycle, or mountain bike, which incorporates a shock absorber having certain features, aspects and advantages of the present invention.

FIG. 1 illustrates an off-road bicycle, or mountain bike 10, including a preferred embodiment of a rear suspension assembly, or shock absorber. The bicycle 10 is described herein with reference to a coordinate system wherein a longitudinal axis extends from a forward end to a rearward end of the bicycle 10. A vertical, central plane generally bisects the bicycle 10 and contains the longitudinal axis. A lateral axis extends normal to the longitudinal axis and lies within a horizontal plane. In addition, relative heights are generally expressed as elevations relative to a horizontal surface on which the bicycle 10 is supported in an upright position. The above-described coordinate system is provided for the convenience of describing the bicycle illustrated in FIGS. 1 and 5, and is not intended to limit the scope of the present invention. In addition, certain features and components of the bicycle may be described in terms of relative positions or directions within the particular positions and orientations reflected in the drawings, which is merely for convenience and is not intended to limit the scope of the invention.

The bicycle 10 includes a frame 12, preferably comprised of a generally triangular main frame portion 14 and an articulating frame portion, or subframe 16. The subframe 16 is pivotally connected to the main frame 14. The bicycle 10 also includes a front wheel 18 carried by a front suspension assembly, or front fork 20. A steerer tube (not shown) is journaled for limited rotation about a steering axis defined by the main frame 14. The fork 20 is secured to the main frame 14 by a handlebar assembly 22, as is well known in the art. A rear wheel 24 of the bicycle 10 is carried by the subframe 16. A shock absorber 26 is pivotally connected to both the main frame 14 and the subframe 16 to provide resistance to the pivoting motion of the subframe 16 and, thus, provide resistance to the suspension travel of the rear wheel 24.

In addition, a seat 28 is connected to the frame 12 by a seat post 30, which is received within the seat tube of the main frame 14. The seat 28 provides support for a rider of the bicycle 10. A pedal crank assembly 32 is rotatably supported by the main frame 14 and drives a multi-speed chain drive arrangement 34, as is well known in the art. The bicycle 10 also includes front and rear brake systems 36, 38 for slowing and stopping the bicycle 10. Although the front and rear brakes 36, 38 are illustrated as disc type brakes, alternatively, rim type brakes may be provided, as will be appreciated by one of skill in the art. Rider controls (not shown) are commonly provided on the handlebar assembly 22 and are operable to control shifting of the multi-speed chain drive arrangement 34 and front and rear brake systems 36, 38.

Figure 2:
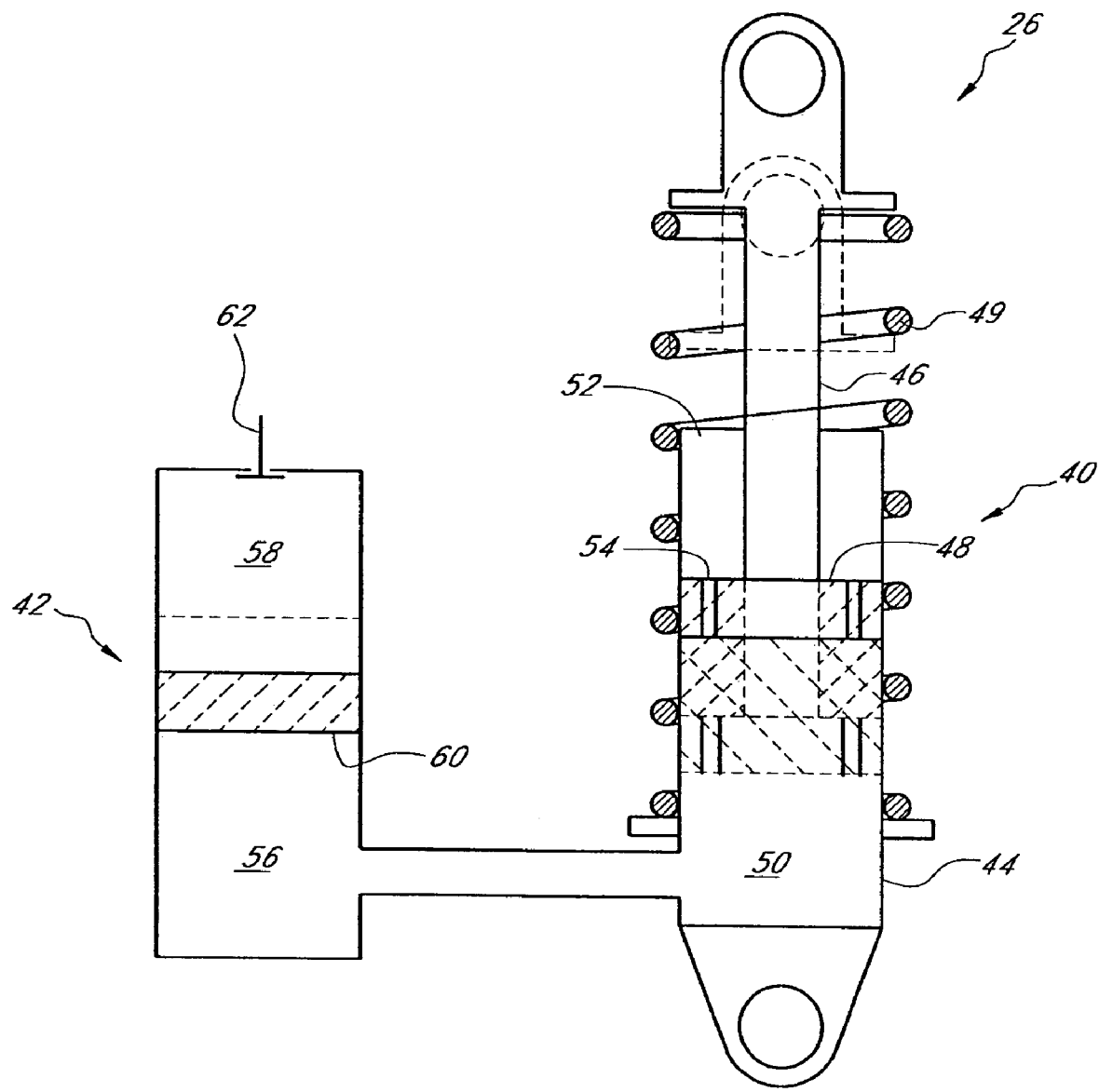
FIG. 2 is an illustrative drawing of the shock absorber of the bicycle of FIG. 1, including a main shock body and a reservoir. Certain internal components of the shock absorber have been omitted for the purpose of clarity.

With reference to FIG. 2 the shock absorber 26 is shown in schematic form with certain components removed for clarity. The shock absorber 26 preferably includes a main shock body 40 and a reservoir 42. The main shock body 40 desirably includes a tube 44 and a piston rod 46. The piston rod 46 carries a piston 48 in sliding engagement with an interior surface of the tube 44. Thus, the piston rod 46 and piston 48 are movable relative to the tube 44. Generally, the shock absorber 26 also includes a suspension spring 49, which is configured to extend the piston rod 46 relative to the tube 44. The illustrated spring 49 is a helical coil spring surrounding the main shock body 40. However, as used herein, the terms suspension spring and spring are broad terms which cover any structure or system tending to move components of the damper relative to one another. For instance, the terms suspension spring and spring are intended to cover, among other structures and systems, mechanical springs (e.g., coil springs, leaf springs and diaphragm springs) and fluid springs (e.g., gas springs). The suspension spring may act indirectly on the damper, such as through a linkage arrangement, for example. In some applications, the shock absorber 26 may be employed without a spring.

The interior of the tube 44 desirably defines a piston chamber and the piston 48 further divides the interior of the tube 44 into a compression chamber 50 and a rebound chamber 52. The piston 48 desirably includes through-ports 54 which permit fluid to flow between the compression chamber 50 and the rebound chamber 52. However, as the piston 48 moves progressively further into the tube 44, the piston rod 46 takes up an increasing volume of the rebound chamber 52. That is, the reduction in volume of the compression chamber 50 is greater than the increase in the volume of the rebound chamber 52 (by an amount equal to the volume of the piston rod 46, or "rod volume", introduced into the tube 44). As a result, a reservoir chamber 56 is provided to accept the excess fluid that cannot be accommodated by the rebound chamber 52.

Thus, the reservoir chamber 56 is an accumulator that accepts excess damping fluid upon compression of the shock absorber 26, and then returns the fluid to the main shock body 40 upon expansion or rebound of the shock absorber 26. Although the illustrated reservoir chamber 56 is defined by a separate structure from the main shock body 40 (a tube, in this instance), in other arrangements the reservoir 42 and shock body 40 may share common structural components. Furthermore, in some arrangements, a separate reservoir chamber 56 may not be provided. Instead, the compression 50 and/or rebound 52 chambers may be configured to vary in volume to accommodate fluid displaced by the piston rod 46. Other suitable compensation mechanisms may also be used.

In the illustrated arrangement, the reservoir chamber 56 is separated from a gas chamber 58 by a separator, such as a floating piston 60. The gas chamber 58 exerts a force on the piston 60, which pressurizes the fluid within the reservoir chamber 56. The piston also acts as a wall of the reservoir chamber 56 and moves in an upward direction in response to the influx of fluid into the reservoir chamber 56. It should be noted that the floating piston 60 may be replaced by other suitable separating structures (such as a flexible diaphragm, for example). Furthermore, preferably, a reservoir sealing cap 61 desirably includes a valve 62 that permits the pressure within the gas chamber 58 to be adjusted. In some arrangements, the gas chamber 58 may be replaced by an alternative compressible material, such as a member formed of compressible closed-cell foam, for example.

Figure 3:
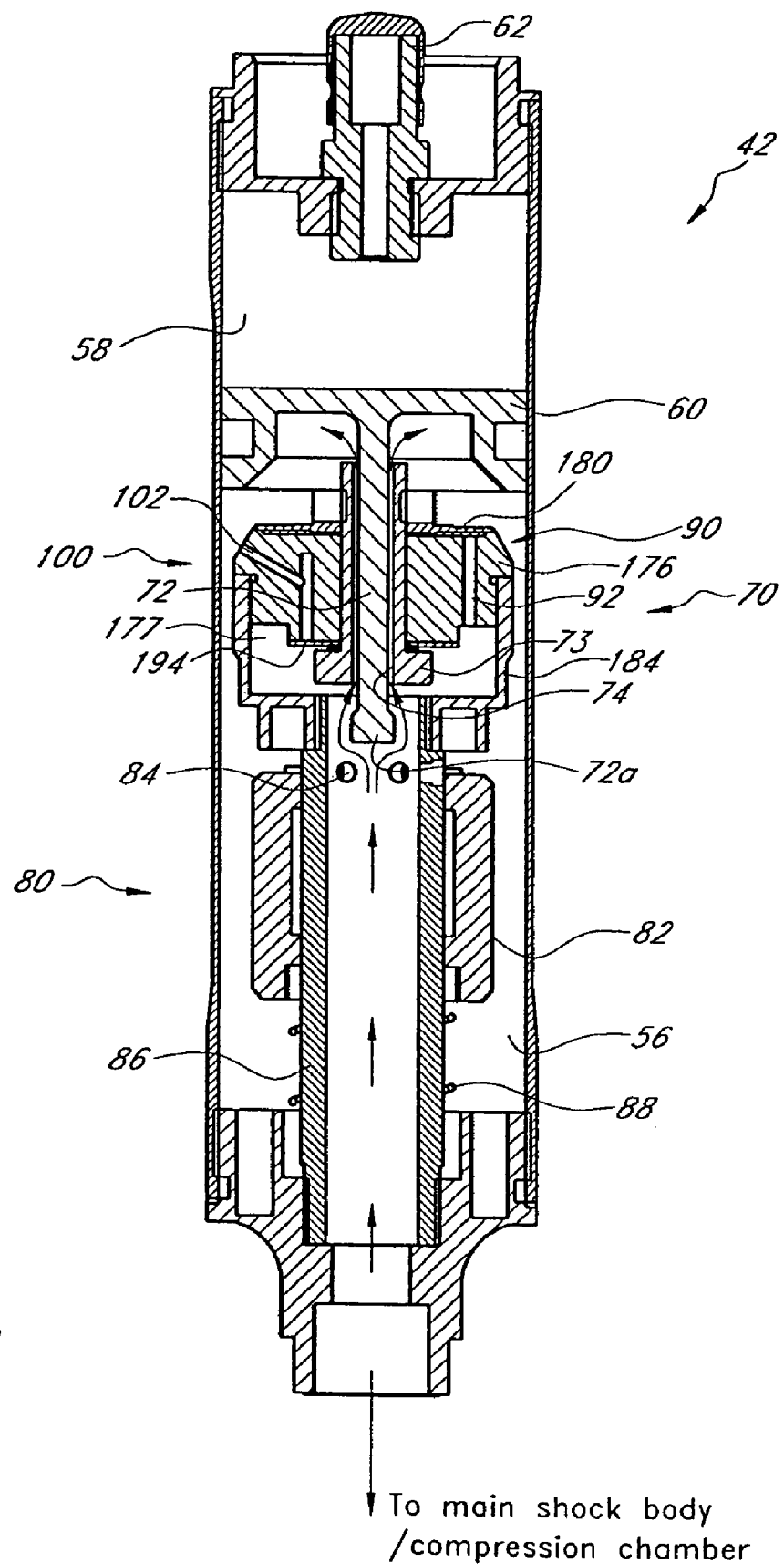
FIG. 3 is a cross-sectional view of the reservoir of a shock absorber of the type illustrated in FIG. 2, which includes a position sensitive valve, a blow off valve and an inertia valve. A floating piston separates a reservoir damping fluid chamber from a gas chamber.

Preferably, additional fluid flow circuits or valve assemblies are included within the reservoir, but are not shown in FIG. 2 for the purpose of clarity. With reference to FIG. 3, a preferred embodiment of the position-sensitive valve assembly 70 utilizes the movement of the floating piston 60 to control a metering valve. FIG. 3 is a cross-section of a reservoir 42 employing a preferred valve assembly 70. However, as discussed above, the reservoir 42 may be omitted and the floating piston 60 may be positioned in an alternative location, such as the main shock body 40, for example.

As illustrated in FIG. 3, a metering rod 72 extends downwardly from the floating piston 60. The metering rod 72 includes an enlarged end portion 72a that selectively permits or prevents fluid flow through a metering rod flow port 74. The O.D. of the enlarged end 72a is sized to permit the enlarged end 72a to enter the metering rod flow port 74 defined by a metering valve sleeve 73. When the enlarged end 72a of the metering rod 72 is present within the metering rod flow port 74, fluid flow through the port 74 is inhibited, and preferably, is at least substantially prevented. However, some amount of flow may occur through a clearance space between the enlarged end 72a and the port 74, which may occur due to normal manufacturing variations or which may be purposefully provided to ensure ease of movement of the metering rod end 72a within the port 74.

In the specific arrangement of FIG. 3, the shock absorber 26 includes an inertia valve 80, which includes an inertia mass 82 that selectively closes fluid ports 84 to inhibit or prevent fluid flow from the main shock body 40 to the reservoir chamber 56. Thus, when the inertia mass 82 of the inertia valve 80 is in a closed (upward) position, flow to the reservoir chamber 56 preferably occurs primarily through the metering rod flow port 74. It is noted that, while the inertia mass 82 may be described as having an open and a closed position, the inertia mass 82 likely does not completely prevent flow through the inertia valve fluid ports 84 in the closed position. That is, a fluid-tight seal is not typically created between the inertia mass 82 and the shaft 86 on which it slides. Thus, some fluid may flow through the inertia valve 80 in its closed position. Such fluid flow is often referred to as "bleed flow" and, preferably, is limited to a relatively small flow rate. To create a fluid-tight seal between the inertia mass 82 and the shaft 86 would require precise dimensional tolerances, which would be expensive to manufacture, and may also inhibit movement of the inertia mass 82 on the shaft 86 in response to relatively small acceleration forces.

As the shock absorber 26 is compressed, the floating piston 60 moves in an upward direction due to the displacement of damping fluid from the main shock body 40 until the enlarged end 72a of the metering rod 72 blocks the flow port 74. Once the flow port 74 is blocked, preferably, fluid is not able to flow (at least at a significant flow rate) into the reservoir chamber 56 and the shock absorber 26 becomes effectively locked-out. That is, the excess fluid from the main shock body 40 cannot be displaced to the reservoir chamber 56, because both the inertia valve ports 84 and the metering rod flow port 74 are closed, and has no place to go. In an alternative arrangement, fluid flow may be only reduced by one or both of the inertia valve 80 and the position sensitive valve assembly 70. In such an arrangement, fluid flow through the inertia valve 80 or metering rod flow port 74 is merely reduced in a closed position versus the flow permitted in an open position to increase a damping force provided by the shock absorber 26.

The illustrated structure allows the shock absorber 26 to move partially through its range of travel to a predetermined "sag" position, before becoming locked-out (or the damping rate increased). Desirably, the sag position is between about 5% and 40% of the total travel of the shock absorber 26 or the shock stroke. Preferably, the sag position is between about 15% and 30% of the shock stroke and, more preferably, is about 25% of the shock stroke. It is noted that, in some bicycle applications, the total travel of the shock absorber 26 when assembled to a bicycle may vary from the total travel of the shock absorber 26 by itself, due to physical limitations imposed by the specific bicycle rear suspension assembly. The lock-out feature is beneficial to inhibiting a riders pedaling movement from compressing the shock absorber 26 and wasting energy. When a bump is encountered, preferably, the inertia valve 80 opens to permit fluid flow from the compression chamber 50 to the reservoir chamber 56 and, thus, compression of the shock absorber 26 is permitted. In other arrangements, the enlarged portion 72a of the metering rod 72 could be positioned elsewhere along the rod 72 to achieve closing of the flow port 74 at other relative positions of the piston rod 46 and tube 44. Furthermore, multiple enlarged portions may also be used to lock-out, or increase the damping rate, at other relative positions of the piston rod 46 and tube 44.

Figure 4:
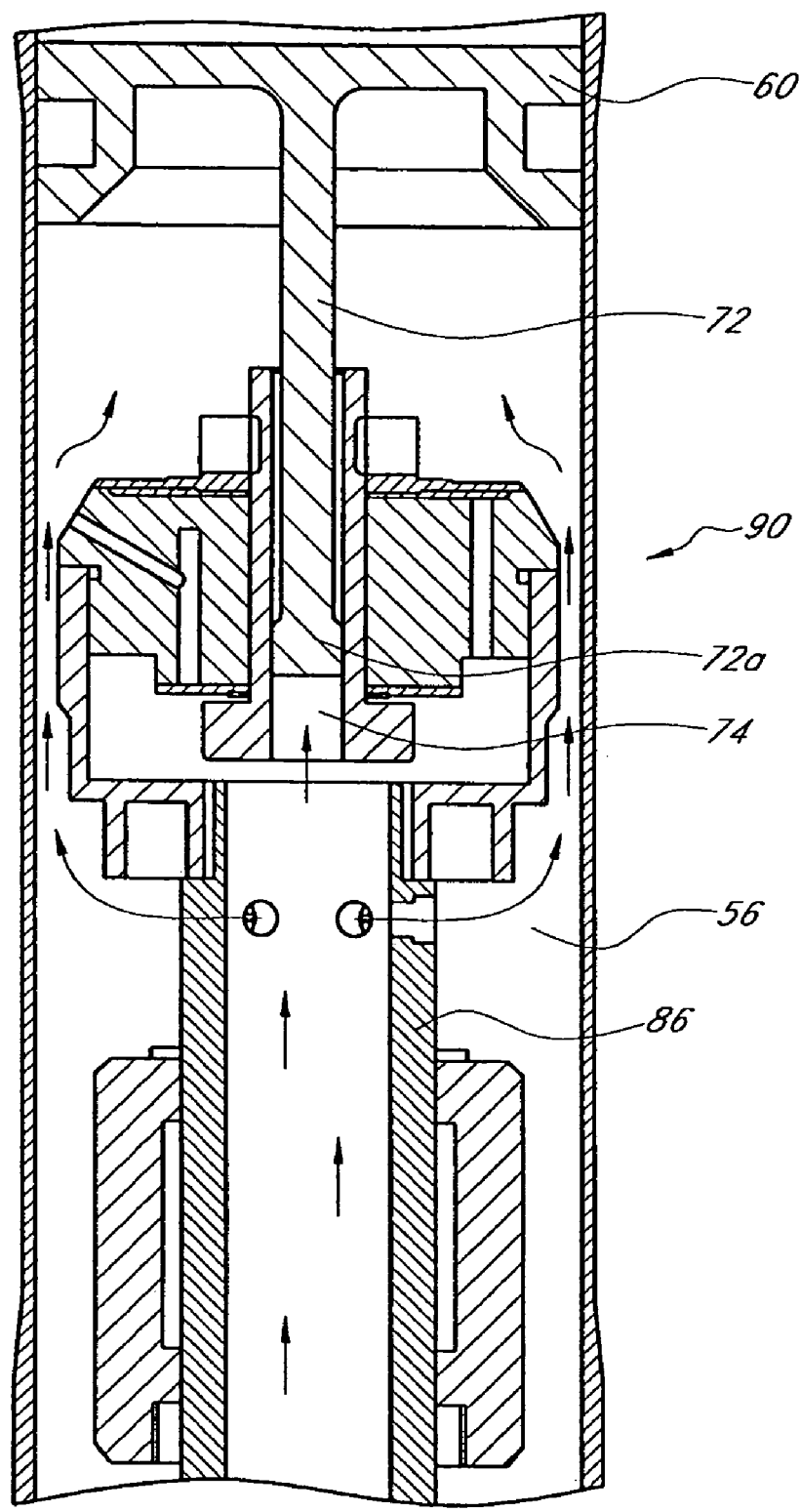
FIG. 4 is an enlarged view the reservoir of FIG. 3 with the floating piston in an elevated position.

FIG. 4 is an enlarged cross-section of the reservoir 42 that shows the position sensitive valve 70 in the closed position having substantially blocked the flow from shaft 86 to the reservoir chamber 56 through the flow port 74. The enlarged end 72a is carried in an upward direction from the open position shown in FIG. 3 by the metering rod 72, which is connected to the floating piston 60. The illustrated position shows fluid flowing in through the open inertia valve 80, bypassing the closed position sensitive valve assembly 70, and displacing the floating piston 60 upward, which draws the enlarged end 72a up and into the flow passage 74.

With reference to FIG. 3, an additional feature of the illustrated shock absorber 26 is that the inertia mass 82 is configured to be held open by fluid flow. That is, preferably, the inertia mass 82 has a relatively large, flat upper surface. The fluid flowing from the inertia valve ports 84 (when the inertia valve 80 is open) is sufficient to overcome the biasing force of the inertia valve biasing spring 88 to maintain the inertia mass 82 in an open position when fluid flow through the ports 84 is present. Preferably, the inertia mass 82 is biased to the open position in this manner substantially to the point that fluid flow ceases (i.e., compression of the shock absorber 26 ceases). Without this feature, the inertia mass 82 will tend to close when acceleration of the shock absorber 26 decreases, which is typically prior to the end of the compression stroke. In other arrangements, it is desirable to allow the inertia mass 82 to move to a closed position more quickly so that the damping rate of the shock absorber 26 increases and, accordingly, the pedaling efficiency of the associated bicycle 10 is quickly restored. In such arrangements, it may be desirable to avoid holding the inertia mass 82 in an open position due to fluid flow through the inertia valve 80 and, thus, the fluid flow control mechanisms, such as the large, flat upper surface of the illustrated inertia mass 82 may be omitted.

Although the illustrated shock absorber 26 includes an inertia valve 80, in other arrangements, the inertia valve 80 may be omitted or may be replaced with, or supplemented with, other compression or rebound fluid flow valves. The inertia valve 80 is preferred because it operates to distinguish terrain-induced forces from rider-induced forces. Terrain-induced forces are generally upwardly directed (compression) forces caused by the vehicle (such as a bicycle) encountering a bump. Rider-induced forces, in the case of a bicycle application, typically are short duration, relatively large amplitude forces generated from the pedaling action of the rider. The inertia valve may alternatively be configured to operate in response to rebound forces, rather than compression forces.

The illustrated reservoir 42 of the shock absorber 26 also includes a bypass valve, or blow-off valve 90. The blow-off valve 90 permits fluid flow in compression of the shock absorber 26 alternative to flow through the inertia valve 80 or position sensitive valve assembly 70. The blow-off valve 90 preferably works in parallel with the inertia valve 80 when the demand for fluid flow is greater than can be handled by the inertia valve 80 alone. However, the blow-off valve 90 may also open while the inertia valve 80 and/or position sensitive valve assembly 70 are closed in response to relatively high fluid pressures to permit compression fluid flow and prevent damage to the seals of the shock absorber 26 or to other components that may be damaged by excessive fluid pressure.

The illustrated blow-off valve 90 includes a blow off fluid chamber 177 defined between a blow off valve base 184 and a blow off valve piston 176. These two components are illustrated in a "cup and lid" type arrangement with the blow off piston 176 being substantially sealed with and on top of the blow off valve base 184. The blow off valve piston 176 includes a number of axial ports 92 extending from the bottom of the valve piston 176 to the top of the valve piston 176, which are capable of transmitting fluid from the blow off chamber 177 to the reservoir chamber 56. The axial ports 92 are preferably spaced around the longitudinal axis of the piston 176. The ends of the axial ports 92 opening into the reservoir chamber 56 are preferably covered by one or more flexible shims 180. The flexible shim 180, preferably, allows fluid to pass from the blow off chamber 177 to the reservoir chamber 56 and prevents fluid flow in the opposite direction. Although a shim-type valve is illustrated in the reservoir 42 of FIG. 3, any other suitable valve structure may also be used.

The illustrated reservoir 42 of the shock absorber 26 further includes a rebound flow valve 100 that permits the flow of fluid from the reservoir chamber 56 back to the compression chamber 50 of the main shock body 40. Thus, fluid that flows to the reservoir chamber 56 through the position sensitive valve assembly 70, inertia valve 80 and/or blow-off valve 90, preferably returns to the main shock body 40 upon expansion or rebound of the shock absorber 26 through the rebound flow valve 100.

The illustrated rebound valve 100 includes another set of ports 102 in the blow off piston 176 that connect the blow off chamber 177 to the reservoir chamber 56. In the illustrated arrangement, the ports 102 include an axial portion opening into the blow off chamber 177 and a generally radial portion opening into the reservoir chamber 56. The ends of the ports 102 opening into the blow off chamber 177 are covered by one or more flexible shims 194. This arrangement allows for fluid to return from the reservoir chamber 56 to the main shock body 40 of FIG. 2. That is, the flexible shim 194 allows fluid to pass from the reservoir chamber 56 to the shaft 86 and prevents fluid flow in the opposite direction. Although a shim-type valve is used in the reservoir 42 of FIG. 3, any other suitable valve may also be used.

Figure 5:
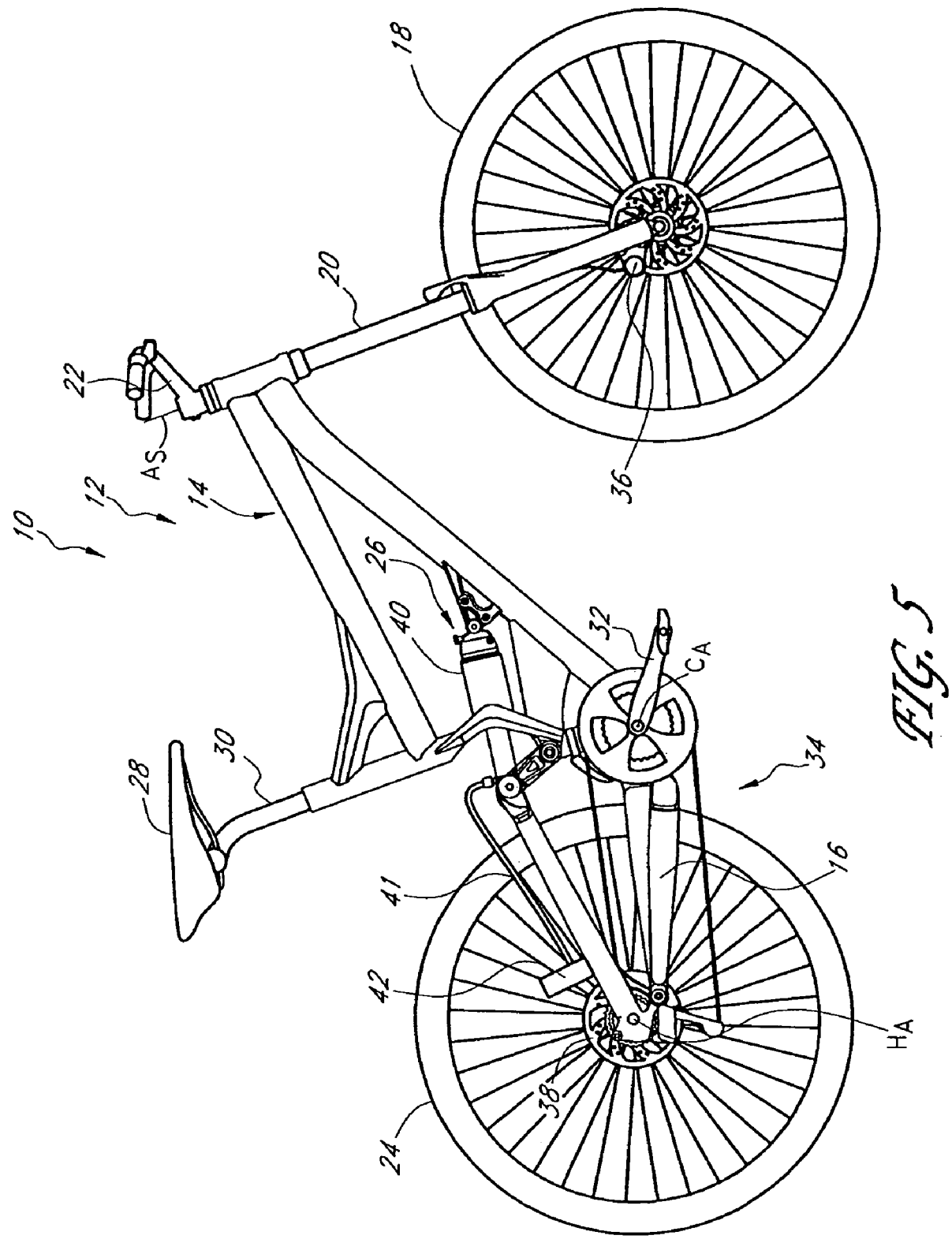
FIG. 5 is an off-road bicycle, or mountain bike, which incorporates a modification of the shock absorber of FIG. 2.

FIG. 5 illustrates an off-road bicycle or mountain bike 10 that is substantially similar to the off-road bicycle 10 illustrated in FIG. 1, but includes a modified version of the shock absorber 26 from that described above. For convenience, components in FIG. 5 will be referred to by the same reference numerals as the corresponding components in FIGS. 1-4. The bicycle 10 of FIG. 5 includes substantially the same features as the bicycle 10 of FIG. 1, including a generally triangular mainframe 14, a pivotally connected subframe 16, a front wheel 18, a rear wheel 24, a shock absorber 26, and a front fork 20.

Unlike the bicycle 10 of FIG. 1, in the bicycle 10 of FIG. 5 the main shock body 40 and reservoir 42 of shock absorber 26 are not structurally connected, but are connected by a flexible hydraulic hose or tube 41. This design modification provides the ability to mount the shock absorber reservoir 42 and the shock absorber main body 40 in relatively different positions. Accordingly, the reservoir 42 may be positioned in a location specific to the application in order to sense terrain features without requiring the main shock body 40 to be in a substantially nearby location.

Figure 6:
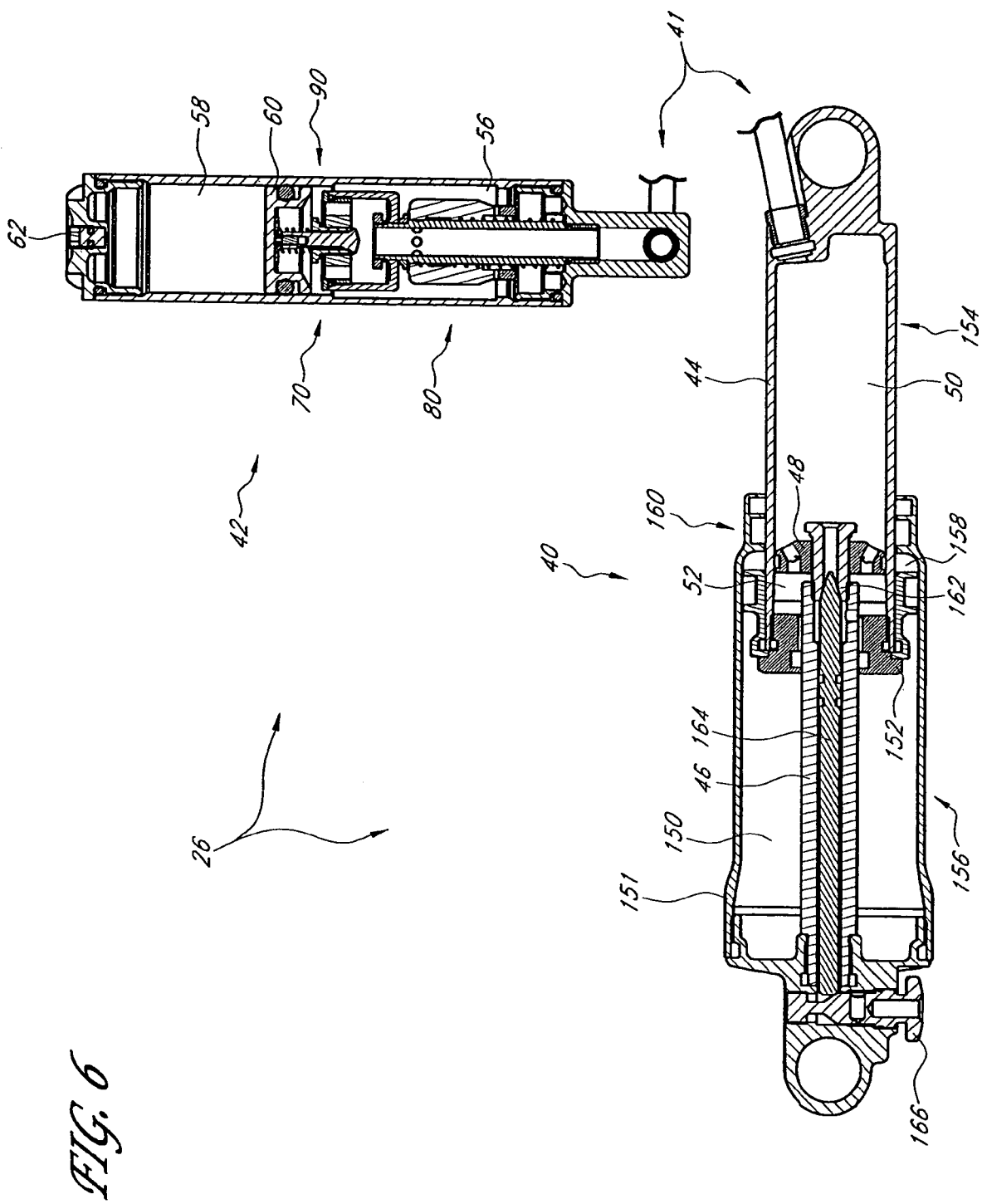
FIG. 6 is a cross-sectional view of the shock absorber of FIG. 5, which includes a main shock body and a reservoir.

FIG. 6 is a cross-sectional view of the shock absorber 26 shown in FIG. 5. The shock absorber 26 includes a main shock body 40 and a reservoir 42 that are hydraulically connected by a hose or tube 41 (not entirely shown). The shock absorber 26 includes a damping assembly 154 and a spring assembly 156. The spring assembly 156 is preferably located within the main shock body 40. The damping assembly 154 is divided between the main shock body 40 and the reservoir 42, with the reservoir 42 including an inertia valve assembly 80 and a position sensitive valve assembly 70.

The shock absorber 26 illustrated in FIG. 6 uses a compressed gas to bias the main shock body 40 toward an extended position. The compressed gas is stored in a gas chamber 150, which is defined by a tube, or gas cylinder 151. The gas chamber 150 is partitioned from the fluid filled compression and rebound chambers 52 and 50 by an annular piston 152. The piston 152 is in sealed, slidable engagement with both the piston shaft 46 and the inner wall of the gas cylinder 151. The illustrated piston 152 is shown as two pieces but may be one integrated piece. The pressure of the compressed gas may be adjustable by a valve (not shown) configured to permit communication with the gas chamber 150.

During operation, the tube 44 is displaced along a longitudinal axis of the main shock body 40 into the interior of gas cylinder 151, which reduces the volume of the gas chamber 150. This reduction of volume increases the pressure of the gas chamber 150 and thus increases the biasing force tending to extend the main shock body 40. A compressed gas shock absorber is beneficial in that the biasing force of the compressed gas may replace that of a metallic coil spring, which results in a reduced weight of the shock absorber 26.

The illustrated shock absorber 26 also includes a negative gas chamber 158 defined between an end seal assembly 160 of the gas cylinder 151 and the piston cap 152. The negative gas chamber 158 exerts a force which resists expansion of the shock absorber 26. This force preferably assists in the initial compression stages of the shock absorber 26 and thus creates a smoother compression action.

With continued reference to FIG. 6, preferably, the damping assembly 154 is fundamentally similar to that used in the shock absorber 26 of FIG. 2. A tube 44 is filled with a damping fluid. A piston 48 is carried by a piston rod 46. The piston 48 separates the tube 44 into a compression chamber 50 and a rebound chamber 52. As the shock compresses and extends, the piston 48 and the piston rod 46 move along a longitudinal axis of the main shock body 40 relative to the tube 44. The movement of the piston 48 through the fluid in the tube 44 produces a damping force that slows the velocity of extension and compression of the main shock body 40.

The piston 48 includes one or more axial compression passages that are covered on the end opening into the rebound chamber 52 by a shim or shim stack. The compression passages and shim or shim stack allows fluid to flow through these passages during compression but not during rebound. During rebound, the fluid flows from the rebound chamber 52 through an adjustable valve 162, located within the interior of the piston rod 46 near the piston 48, and into the compression chamber 50. The flow rate through the valve 162 is controlled by an adjustment rod 164 that is preferably connected to an external adjustment knob 166. In addition, other flow circuits between the compression and rebound chambers may also be provided.

During compression, the piston 48 moves progressively further into the tube 44 and the piston rod 46 takes up an increasing volume of the rebound chamber 52, as discussed above. Accordingly, a reservoir chamber 56 is provided to accept the excess fluid that cannot be accommodated by the rebound chamber 52. The fluid flow into the reservoir 42 is preferably controlled by one or more of the position sensitive valve assembly 70, the inertia valve assembly 80 or the blow off valve 90 at any given time. Thus, preferably, these valve assemblies control the compression damping of the shock absorber 26.

With reference to FIGS. 7-14, the position sensitive valve assembly 70, the inertia valve assembly 80 and the blow off valve 90 of the shock absorber 26 of FIG. 6 are described in greater detail. As discussed above, when damping fluid is introduced into the reservoir 42 due to displacement of fluid from the main shock body 40 by the piston rod 46, the fluid may enter the reservoir 42 through any of the position sensitive valve assembly 70, the inertia valve assembly 80 and the blow off valve 90, depending upon the various operational factors at that particular time. If the fluid flow is a result of a shock absorber compression induced by a downward force, such as a rider sitting on a bicycle, the fluid will preferably enter the reservoir 42 through the position sensitive valve 70, until the floating piston 60 has displaced a predetermined amount and the position sensitive valve 70 closes. The resulting compression position of the shock absorber 26 preferably corresponds to a desired sag position.

If a downward force continues to be applied to the shock absorber 26, fluid flow through the position sensitive valve 70 preferably is prevented, such that the shock absorber 26 remains substantially rigid, or locked-out, until the fluid pressure increases to a threshold necessary to activate the blow off valve 90. Additional fluid flow into the reservoir chamber 56 continues to displace the piston 60 in an upward direction.

If an upward wheel force is applied to the shock absorber 26 sufficient to open the inertia valve 80, fluid is permitted to enter the reservoir chamber 56 through the inertia valve 80. If the fluid pressure within the compression chamber 50 increases above a threshold pressure, with or without the inertia valve 80 being open, fluid flow is permitted through the blow off valve 90 thus preventing any damage to shock absorber components that are sensitive to high fluid pressure conditions and/or allowing for a large volume of fluid to be displaced on larger bump impacts. After the compression force applied to the shock absorber 26 is sufficiently reduced or removed, the spring assembly 156 tends to extend the shock absorber 26. In response, fluid is permitted to exit the reservoir chamber 56 through the rebound valve 100.

In a number of respects, the position sensitive valve 70 of FIGS. 6-14 is similar in construction and function to the valve 70 described above in connection with FIGS. 1-4. However, in the position sensitive valve 70 of FIGS. 6-14, the metering rod 72 is not coupled to the floating piston 60. Accordingly, the length of the metering rod 72 does not need to be determined by the distance of movement of the floating piston 60, which is related to the total travel of the shock absorber 26.

The illustrated position sensitive valve 70 includes the metering rod 72, a metering rod sleeve 73, a flange 172, and a biasing spring 170. As discussed immediately above, the metering rod 72 is not attached to the floating piston 60. The illustrated metering rod 72 is however, opened and closed by axial movement of the floating piston 60 along a longitudinal axis of the reservoir 42. The metering rod 72 is a generally cylindrical rod that is movable within the metering rod sleeve 73. The metering rod sleeve 73 is a tube with one end forming an enlarged flange. The flange creates a stop surface for installation of the metering rod sleeve 73 into the blow off valve piston 176 and preferably retains the shims of the blow off valve 90 against the blow off valve piston 176. The metering rod sleeve 73 preferably is attached to the blow off valve piston 176 by a threaded interface, however, other suitable attachment mechanisms could also be used. In some arrangements, the metering rod sleeve 73 and the blow off valve piston 176 may be a single component.

The metering rod 72 preferably includes two enlarged ends. The bottom end 72a is sized such that it that does not allow the metering rod 72 to pass through the flow passage 74. The enlarged end 72a and the lower end of the flow passage 74 preferably are configured to cooperate as a valve body and a valve seat respectively, to selectively permit or prevent fluid flow through the flow passage 74.

The top end of the metering rod 72 preferably includes a flange 172 that is removably attached to the metering rod 72. One advantage of having the flange 172 removable from the metering rod 72 is that it allows for ease of assembly of the metering rod 72 within the flow passage 74 of the blow off valve piston 176. A biasing spring 170 contacts the bottom surface of the flange 172 and the top surface of the metering rod sleeve 73 to biased the metering rod 72 into a closed position. Preferably, the biasing spring 170 is configured to apply a force to the metering rod 72 sufficient to create a substantially fluid tight seal between the metering rod sleeve 73 and the enlarged end of the metering rod 72a.

The metering rod 72 preferably includes longitudinal grooves 182 (FIG. 11) to increase a flow area of the fluid flow passage 74 and allow for greater fluid flow when the position sensitive valve assembly 70 is in the open position. The grooves 182 are illustrated as being generally semi-cylindrical, but may be of any suitable shape to enhance fluid flow through the passage 74. A lower end of each groove 182 is spaced upwardly from the enlarged end 72a of the metering rod 72 so as to not allow fluid flow past the closed metering valve 178. It may be desirable, in some arrangements, to extend the grooves 182 to the enlarged end 72a of the metering rod 72 in order to permit a limited amount of bleed flow when the metering valve 178 is closed.

One of the advantages of the position sensitive valve assembly 70 of FIGS. 7-14 is the reduced size over the position sensitive valve assembly 70 of FIG. 3-4 because the length of the metering rod 72 is not determined by the amount of travel of the floating piston 60 (or shock absorber 26). Since the metering rod 72 is not connected to the floating piston 60 the metering rod 72 can be made shorter as it is not required to travel with the floating piston 60 through the floating piston's entire stroke. This allows the metering rod 72 to be made only long enough to move with the floating piston 60 between the fully extended and sag position, and not during the entire compression stroke of the shock absorber 26. As with many suspended vehicles, including bicycles, weight is a very important factor that determines relative performance of a product over that of a competitor's. The reduced size of the position sensitive valve assembly 70 of FIG. 7-14 allows the weight to be reduced.

With reference to FIGS. 7-10 the reservoir 42 also includes an inertia valve assembly 80 which includes an inertia mass 82 that selectively closes fluid ports 84 to inhibit or prevent fluid flow from the main shock body 40 to the reservoir chamber 56. Thus, when the inertia mass 82 of the inertia valve 80 is in a closed (upward) position, flow to the reservoir chamber 56 preferably is only possible through the metering rod flow port 74 or the blow off valve 90.

Similar to the inertia valve 80 of FIGS. 3 and 4, inertia mass 82 of FIGS. 6-10 is configured to be held open by fluid flow. That is, the inertia mass 82 has a relatively large, flat upper surface. The fluid flowing from the inertia valve ports 84 (when the inertia valve 80 is open) is sufficient to overcome the biasing force of the inertia valve biasing spring 88 to maintain the inertia mass 82 in an open position until fluid flow ceases (i.e., compression of the shock absorber 26 ceases). Without this feature, the inertia mass 82 will tend to close when acceleration of the shock absorber 26 decreases, which is typically prior to the end of the compression stroke.

Another additional feature of the illustrated inertia valve 80 is that the bottom of the inertia mass 82 includes a plurality of radial fluid flow ports 186 that extend through a lower end of the inertia mass 82. The ports 186 permit fluid to be evacuated from an annular space 187 between the lower end of the inertia mass 82 and the shaft 86 as the inertia mass 82 moves in a downward direction on shaft 86. Advantageously, such a feature reduces the resistance to downward movement of the inertia mass 82 to enhance the sensitivity of the inertia valve 80. Furthermore, in the fully open position, the bottom of the inertia mass 82 comes into contact with the top of reservoir base 188. This contact could undesirably restrict the inertia mass 82 to the reservoir base 188 by suction. The ports 186 allow fluid to relieve the undesirable suction and allow the inertia valve spring 88 to bias the inertia mass 82 back to its closed position without any opposing forces created by suction.

Another additional feature of the illustrated inertia valve 80 is that the reservoir base 188 includes a plurality of cavities 189. The cavities 189 are preferably in a radial arrangement around the base of the shaft 86 and extend from the top side of the reservoir base 188, facing the reservoir chamber 56, to a partial depth into the base 188. One benefit of the cavities 189 is that they provide a reduced contact area between the inertia mass 82 and the reservoir base 188 when the inertia mass 82 is in the downward, or open position. This feature advantageously helps to reduce any vacuum that may occur between the inertia mass 82 and the reservoir base 188. Another benefit of the cavities 189 is that they reduce the weight of the reservoir base 189. A lighter weight is desirable in many bicycle applications due to the higher possible speeds that may be attained with reduced equipment weight.

Figure 8:
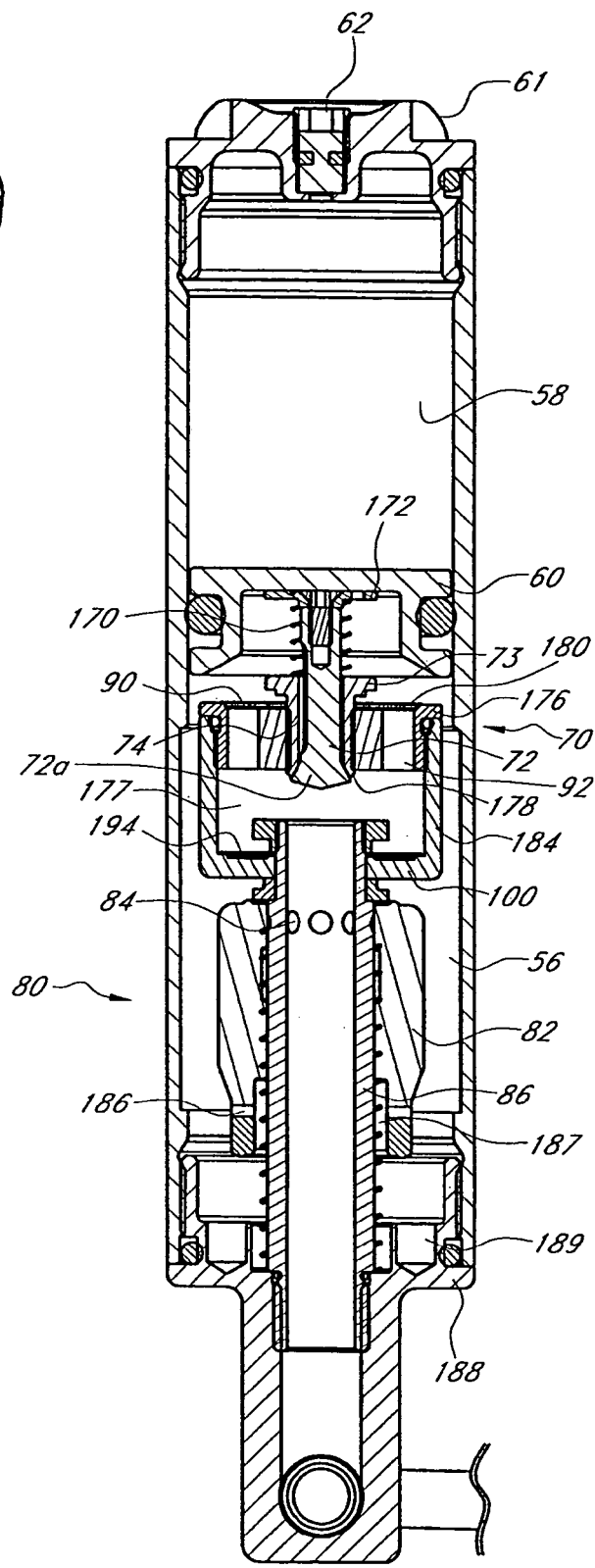
FIG. 8 is an enlarged cross-sectional view of the reservoir of FIG. 6, illustrating a position sensitive valve, a blow off valve and an inertia valve.
Figure 9:
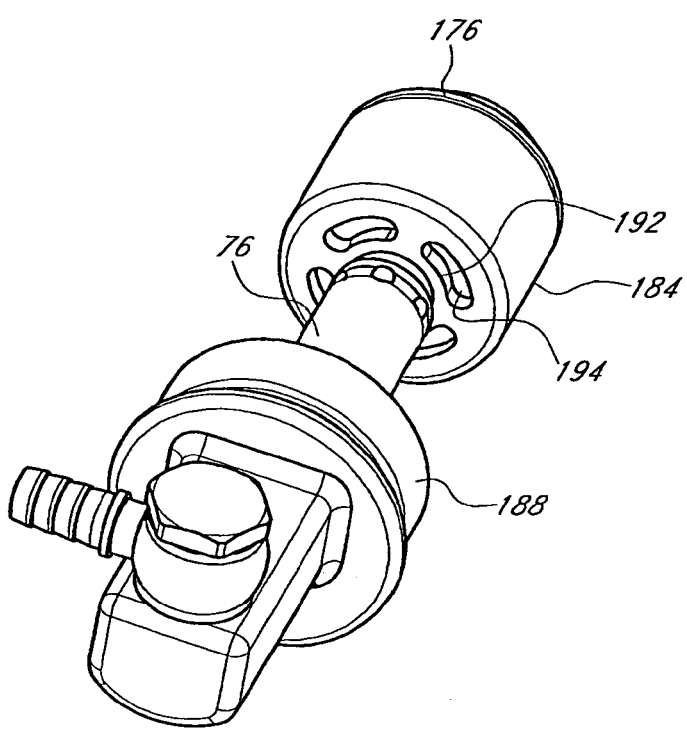
FIG. 9 is a perspective view of certain components of the reservoir of FIG. 6.
Figure 10:
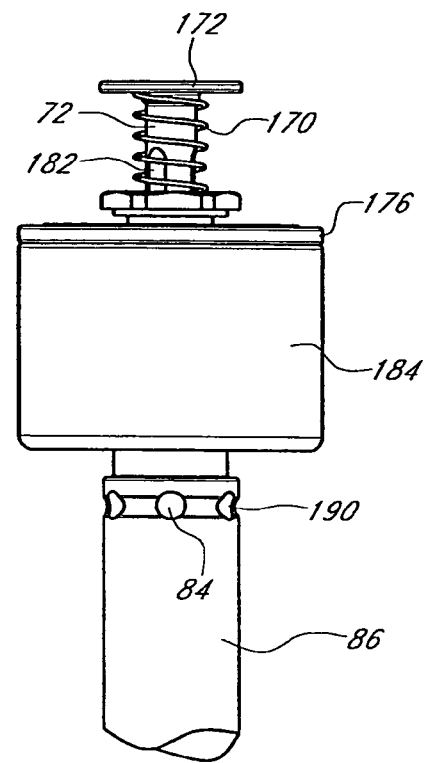
FIG. 10 is a side view of certain internal components of the reservoir of FIG. 6, including components of a metering valve of the position sensitive valve assembly.
Figure 11:
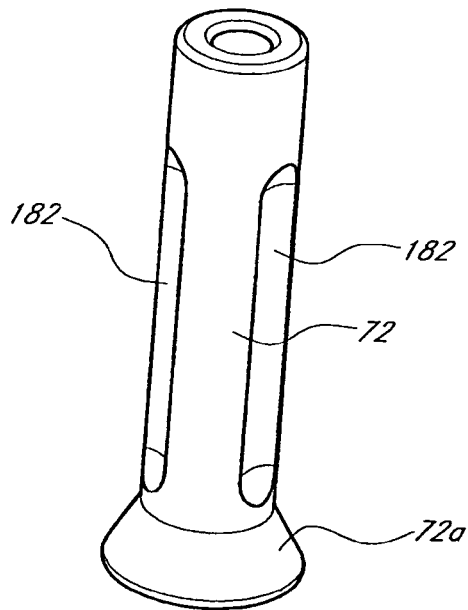
FIG. 11 is a perspective view of a metering rod of the metering valve of FIG. 10.

With reference to FIGS. 8 and 10, another advantageous feature of the illustrated inertia valve 80 is a circumferential groove 190 in the shaft 86 aligned with the inertia valve flow ports 84. The groove 190 is preferably semi circular in cross-sectional shape and has a centerline that passes through the center points of the inertia valve flow ports 84. The width of the groove 190 preferably is less than the diameter of the inertia Valve flow ports 84 such that the ports 84 have portions extending both above and below the groove 190. The groove 190 allows communication of the fluid exiting the collection of inertia valve flow ports 84. From the groove 190, fluid pressure is applied evenly over the inner circumference of the inertia mass 82. The even distribution of fluid pressure preferably creates a force tending to center the inertia mass 82 around the shaft 86, thus partially or fully compensating for any inconsistencies in fluid pressure that would otherwise occur due to variations in size between the inertia flow ports 84. Such a feature helps to prevent binding of the inertia mass 82 on the shaft 86. The prevention of binding of the inertia mass 82 on the shaft 86 is beneficial in a bicycle application because it is desirable that the inertia valve be very sensitive to any terrain features which may only transmit relatively small acceleration forces to the inertia valve 80.

Although the illustrated reservoir 42 includes an inertia valve 80, in other arrangements, the inertia valve 80 may be omitted or may be replaced with, or supplemented with, other compression or rebound fluid flow valves. The inertia valve 80 is preferred because it operates to distinguish terrain-induced forces from rider-induced forces. Terrain-induced forces are generally upwardly directed (compression) forces caused by the vehicle (such as a bicycle) encountering a bump. Rider-induced forces, in the case of a bicycle application, typically are short duration, relatively large amplitude forces generated from the pedaling action of the rider. The inertia valve may alternatively be configured to operate in response to rebound forces, rather than compression forces.

Figure 7:
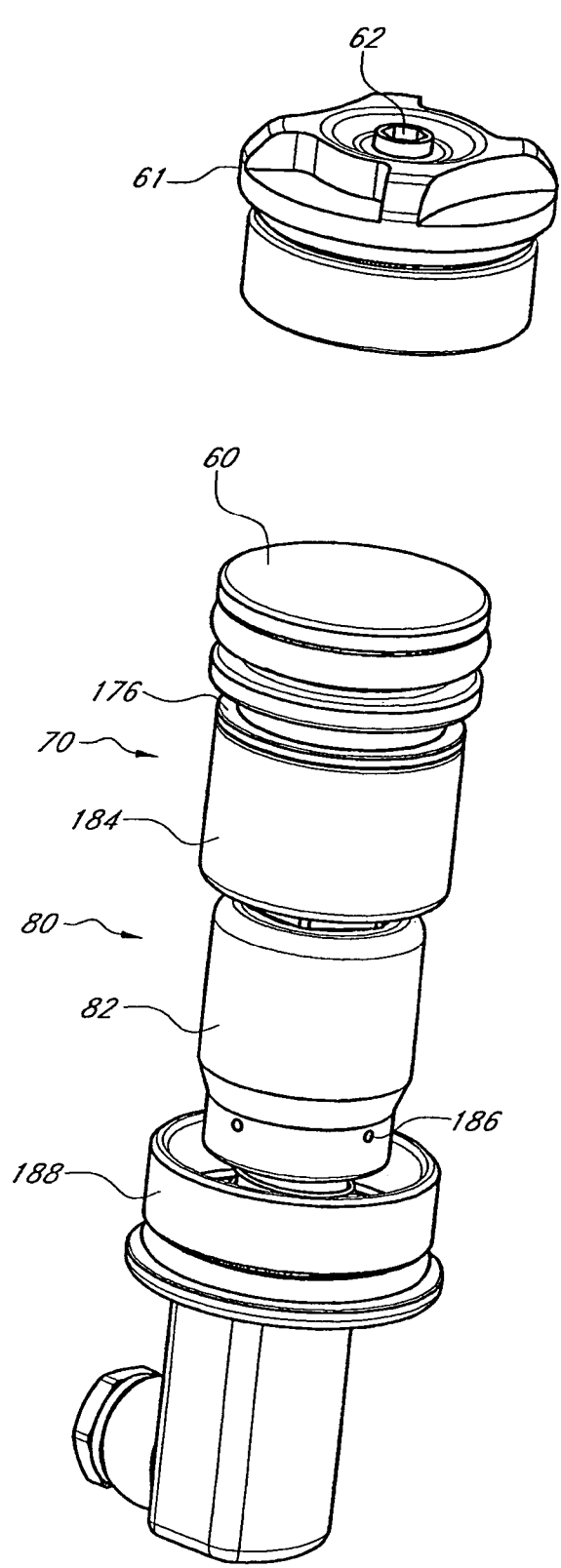
FIG. 7 is a perspective view of the reservoir of FIG. 6 with certain components removed for clarity.
Figure 14:
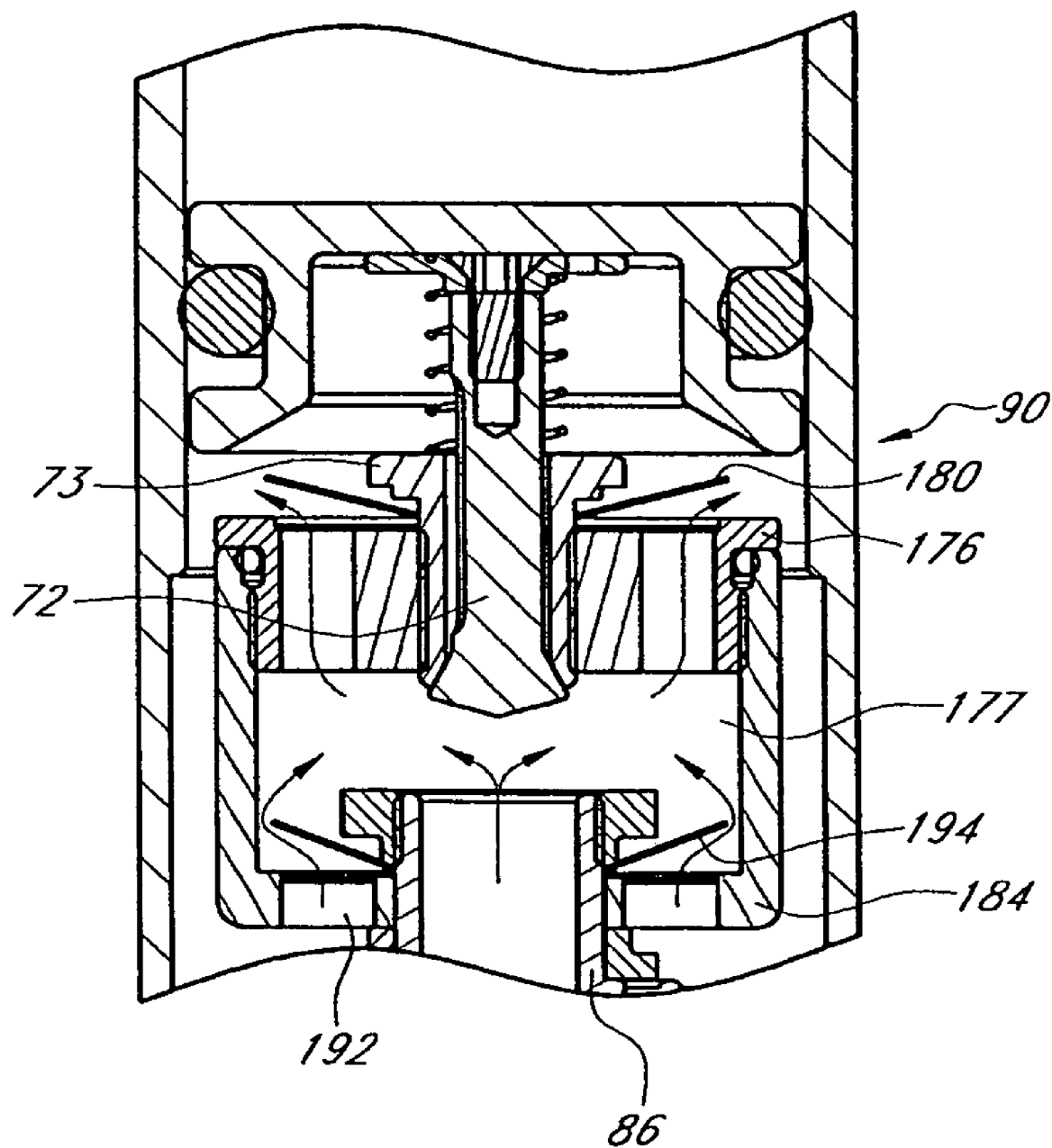
FIG. 14 is an enlarged cross-sectional view of the position sensitive valve in a closed position with the blow off and rebound valves open.

With reference to FIGS. 7-8 and 14, the reservoir 42 preferably includes a blow off fluid chamber 177 on top of and in fluid communication with the interior space of the shaft 86. The blow off chamber 177 is defined between the blow off valve base 184 and the blow off valve piston 176. These two components are illustrated in a "cup and lid" type arrangement with the blow off piston 176 being substantially sealed with and on top of the blow off valve base 184. The blow off valve is located at the top of the blow off chamber 177.

The blow off piston 176 includes a plurality of axial ports 92 that are covered by a flexible shim 180 on the top side of the blow off piston 176. The blow-off valve 90 preferably is configured to open in response to relatively high fluid pressures in the blow-off chamber 177, such as when a relatively large impact occurs while the inertia valve 80 and/or position sensitive valve assembly 70 are closed. The blow-off valve 90 is also configured to permit compression fluid flow and prevent damage to the shock absorber seals or other components that may be damaged by excessive fluid pressure and/or to permit high fluid flow to allow for proper shock movement on higher frequency impacts. Although a shim type valve is used in the reservoir of FIG. 7-8 and 14, other suitable valve structures may also be used.

With reference to FIGS. 7-9 and 14, the bottom of the blow off valve base 184 preferably includes semi-circular holes 192 (FIGS. 9 and 14) with a flexible shim 194 covering the top of the holes on the inside of the blow off valve base 184. The flexible shim 194 is attached between the top of the blow off valve piston 180 and the bottom of the flange of the metering rod sleeve 73. This arrangement allows for fluid to return from the reservoir chamber 56 to the main shock body 40 (FIG. 6). The flexible shim 194, preferably, allows fluid to pass from the reservoir chamber 56 to the shaft 86 and restricts fluid flow in the opposite direction. The fluid flow direction and open position of the rebound valve 100 are illustrated in FIG. 14.

Figure 12:
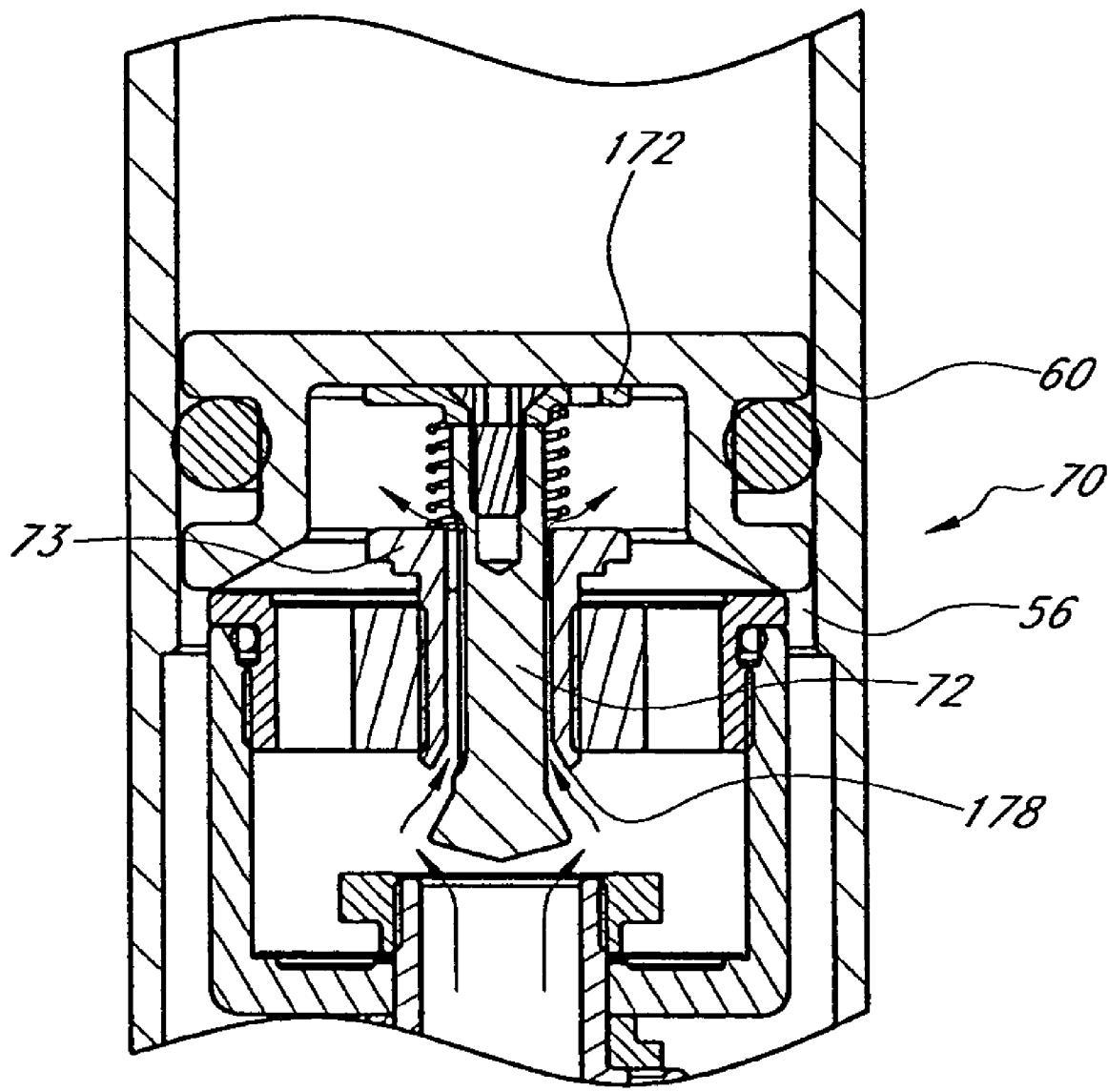
FIG. 12 is an enlarged cross-section view of the position sensitive valve in an open position.

In FIG. 12 the position sensitive valve 70 is shown in the open position. In this orientation, the floating piston 60 is in contact with the metering rod flange 172 to bias the metering rod 72 downward into an open position. Thus, fluid communication is permitted between the compression chamber 50 and the reservoir chamber 56. With the position sensitive valve assembly 70 in the open position, the fluid is able to bypass the inertia valve 80 and blow off valve 90 until the shock absorber 26 has reached the proper ride height or sag position and the position sensitive valve assembly 70 closes.

Figure 13:
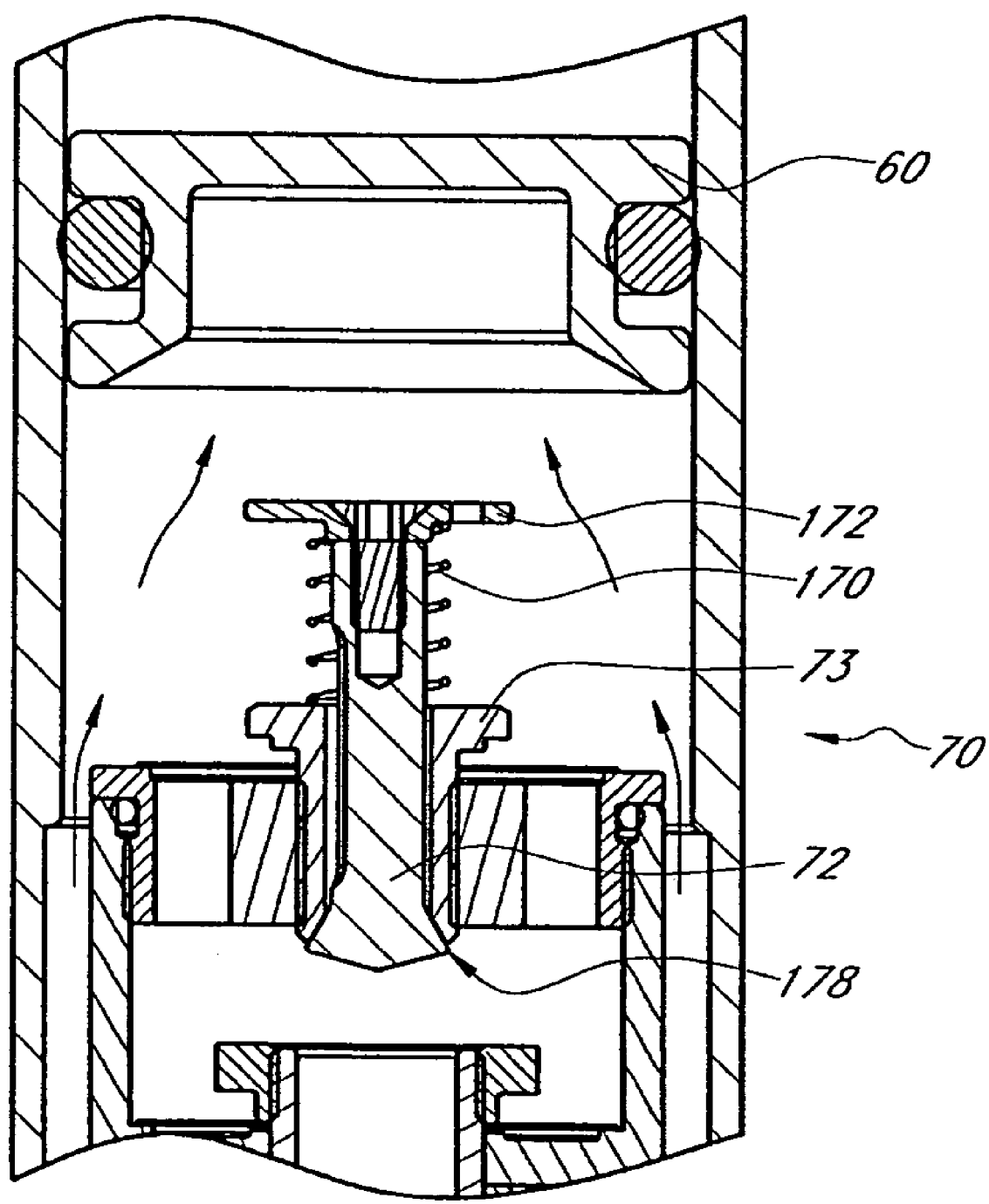
FIG. 13 is an enlarged cross-section view of the position sensitive valve in a closed position.

FIG. 13 illustrates a closed position of the position sensitive valve assembly 70. In this position the floating piston 60 is in an elevated position in which it is spaced from the upper surface of the metering rod flange 172. In this orientation of the position sensitive valve assembly 70, the metering valve 178 is in the closed position by the biasing force of the metering rod spring 170.

FIG. 14 illustrates the blow off valve 90 in the open position. In the illustrated orientation, the fluid in the shaft 86 (and compression chamber 50) has reached a relatively high pressure and this pressure causes the shim 180 to deflect away from the blow off piston 176. The fluid then flows from the shaft 86 and into the reservoir chamber 56. This scenario is likely caused by a large impact on the shock absorber 26. As described above, depending upon the impact force, the blow-off valve 90 may open in addition to one or both of the position sensitive valve 70 and the inertia valve. Alternatively, the blow-off valve 90 may be configured to open only at fluid pressures that would be likely to occur while the inertia valve 80 and the position sensitive valve 70 are both in the closed position.

Figure 15:
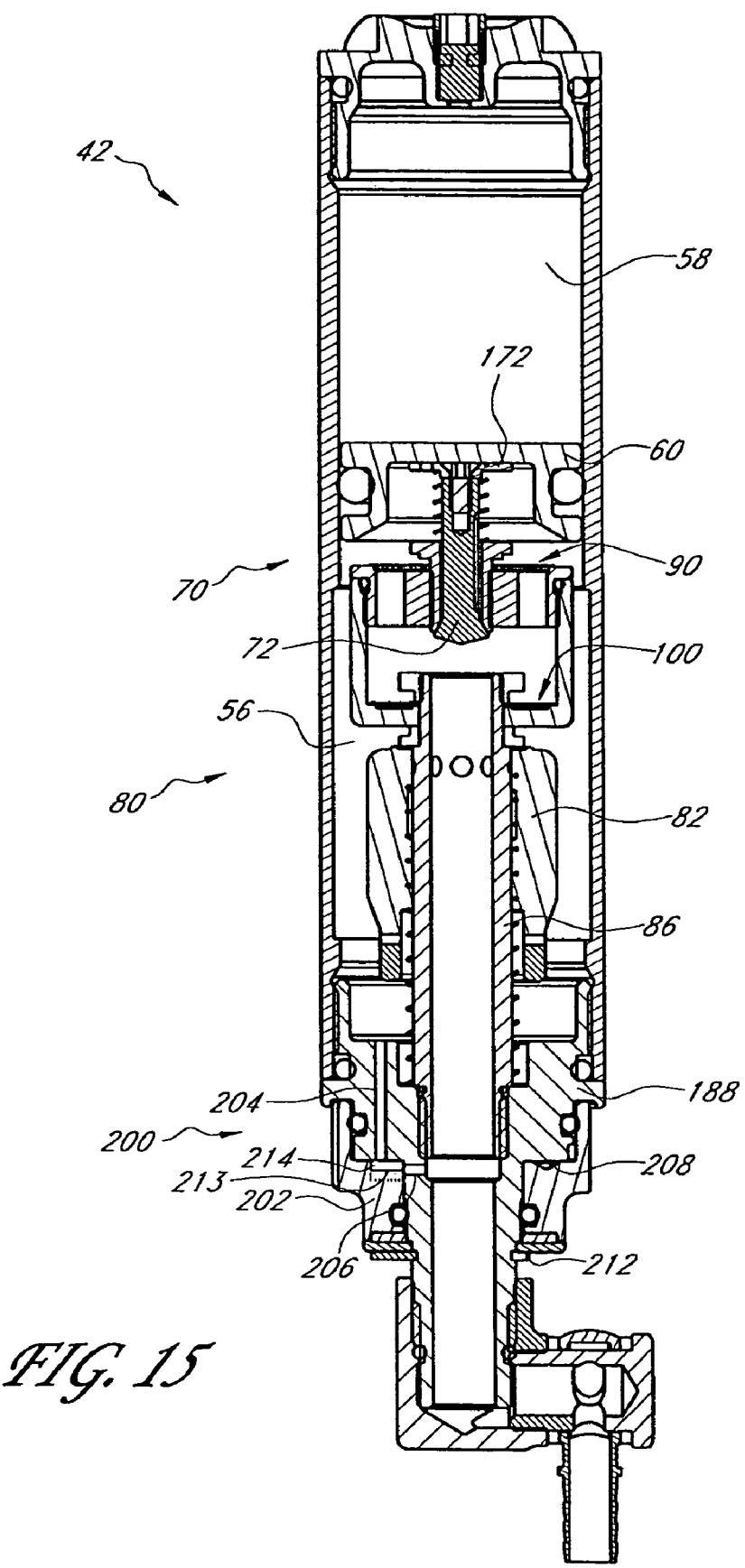
FIG. 15 is a cross-sectional view of a modification of the reservoir of the shock absorber of FIG. 6. The reservoir of FIG. 15 incorporates an externally adjustable bypass valve.

FIG. 15 illustrates another modification of reservoir 42 of the shock absorber 26 of FIGS. 1-4 and 5-14. In a number of respects, the reservoir 42 of FIG. 15 is substantially similar to the reservoir 42 of FIGS. 7-14. For convenience similar components will be referred to by the same reference numerals as the corresponding components of FIGS. 1-14. The illustrated reservoir 42 includes a floating piston 60 that partitions a gas chamber 58 from the damping fluid of the reservoir chamber 56, a position sensitive valve assembly 70, an inertia valve assembly 80, a blow off valve 90, and a rebound flow valve 100. The floating piston is in slidable and sealable engagement with the inside wall of the tube of reservoir 42. The inertia valve 80 is opened and closed by an inertia mass 82 that is preferably in slidable engagement with the shaft 86. The position sensitive valve is opened and closed by the movement of the floating piston 60.

The reservoir 42 of FIG. 15, however, also includes an additional flow circuit 200 in the lower portion of the reservoir 42 and, preferably, within the reservoir base 188. The circuit 200 bypasses or augments the other flow circuits of the reservoir 42, preferably including the position sensitive valve 70, the blow off valve 90, the rebound valve 100, and the inertia valve 80.

The circuit 200 preferably includes an adjustment knob 202 that is rotatable about the lower portion of the reservoir base 188. The adjustment knob 202 is secured in place relative to the base 188 by a suitable retention member, such as a cir-clip 212. The adjustment knob 202 includes a number of detents 208 which aid the user to locate the adjustment knob 202 into one of a number of easily locatable rotational positions. The adjustment knob 202 also includes a ramped surface 213, which defines a bottom wall of an inner cavity 214 between the base 188 and the knob 202. The adjustment knob 202 is configured so as to locate the ramped surface 213 of the cavity 214 to variably block the flow between a shaft port 206 and a reservoir base port 204.

The shaft port 206 extends radially from the inside of the lower portion of the shaft 86 to the cavity 214. The reservoir base port 204 extends axially from the cavity 214 to the reservoir chamber 56 through the reservoir base 188. The rotation of the adjustment knob positions the ramped surface 213 to move between various positions covering varying portions of the shaft port 206 and thus allows different amounts of fluid to flow out of the shaft port 206 and into the reservoir base port 204.

By adding this additional flow circuit 200 to the reservoir 42, the user is able to control, by the adjustment knob 202, the amount of influence the other valves in the reservoir 42 have on the compression and rebound characteristics of the shock absorber 26. For example if the user desires the shock absorber 26 to be greatly influenced by terrain forces, he/she could close this additional flow circuit by the adjustment knob 202 and urge the fluid to travel through the other valves in the reservoir including the inertia valve 80 and the position sensitive valve 70. If the user desires the shock absorber 26 to be less influenced by terrain forces, he/she could open this additional flow circuit by the adjustment knob 202 and allow the fluid to flow through the alternate flow circuit and partially bypass the other valves in the reservoir including the inertia valve 80 and the position sensitive valve 70. This example is used only to illustrate a possible scenario in which the additional flow circuit could be used and is not intended to limit the scope or intended use of the design modification.

In an alternative arrangement, the position sensitive valve 70 is configured to be adjustable to adjust the specific sag position of the shock absorber 26. One possibility is to configure the flange 172 of the metering rod 72 to be adjustable along the length of the metering rod 72 by an external adjustment knob (not shown). The adjustment knob (not shown) could be connected to an adjustment rod (not shown) which extends through a seal assembly on the top of the reservoir 42 and through a seal assembly in the center of the floating piston 60. The piston 60 is free to move along the longitudinal axis of the adjustment rod 204 and maintains a gas seal that separates the gas chamber 58 from the fluid in the reservoir chamber 56. The turning of the external adjustment knob would cause the distance between the flange 172 and the enlarged end 72a of the metering rod 72 to change. Thus, the turning of the knob would preferably change the ride height of the shock absorber 26 by changing the point at which the position sensitive valve 70 is permitted to move to the closed position by the floating piston 60.

Another possible way to have the position sensitive valve 70 adjustable is to adjust the volume of the reservoir chamber 56. By adjusting the volume in the reservoir chamber 56 one could adjust the corresponding position of the floating piston 60 to a compression or extension position of the shock absorber 26. This would in turn adjust the closing point of the position sensitive valve 70 relative to the compression or extension position of the shock absorber 26. This adjustability could be achieved in a variety of ways. One possible way this could be achieved is by making one end of the reservoir chamber 56, such as the reservoir base 188, adjustable by a threaded or ramped adjustment knob or lever. This altering of the height of the reservoir base 188 could achieve the aforementioned adjustability.

One advantage of having the position sensitive valve 70 externally adjustable is the user of the shock absorber 26 can compensate for different operating conditions of the vehicle. For example, in a bicycle application, a rider may have a particular preference regarding the ride height of the bicycle. This could be due to terrain conditions or variables in other components such as the frame or fork, which may influence the ride height of the bicycle.

Figure 18:
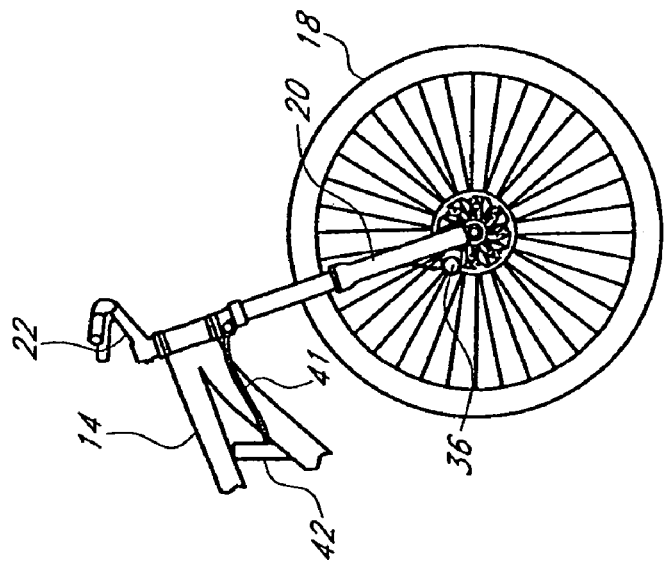
FIG. 18 illustrates yet another alternative position of the reservoir wherein the reservoir is mounted to the frame of the off-road bicycle and communicates with the front suspension via a tube.
Figure 17:
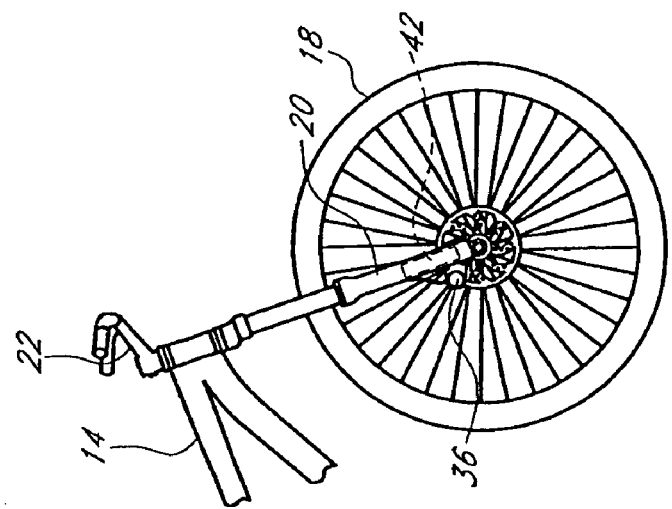
FIG. 17 illustrates an alternative position of the reservoir internal to the front suspension of the off-road bicycle.
Figure 16:
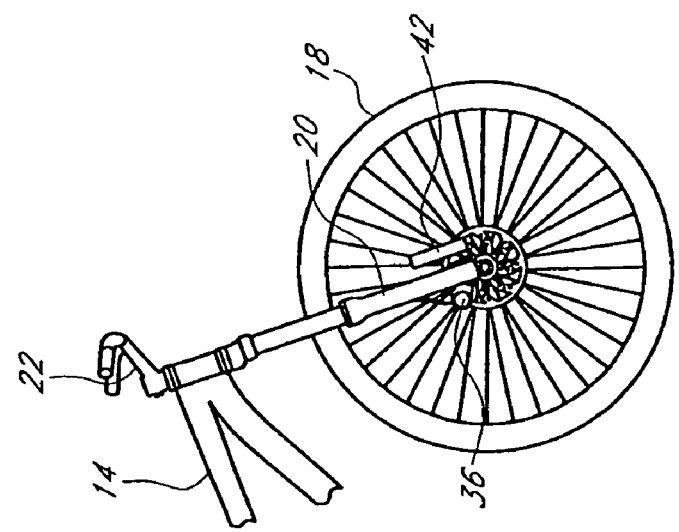
FIG. 16 illustrates an external reservoir, similar to the reservoir of FIGS. 6-15, incorporated into a front wheel suspension of an off-road bicycle.

Although the preferred embodiment of the shock absorber 26 illustrated in FIG. 1 and FIG. 5 are used with the rear wheel of a bicycle, in other preferred embodiments, it may also be incorporated into the front wheel of the bicycle. FIG. 16, FIG. 17 and FIG. 18 all illustrate alternative preferred embodiments of the position sensitive shock absorber in the form of a telescopic fork 20 with a reservoir 42 in various configurations.

FIG. 16 illustrates a front wheel suspension system of a bicycle. The illustrated front wheel suspension system uses telescopic, dual leg, fork 20. However, a single leg or linkage system may also be used as will be appreciated by one skilled in the art. A steerer tube (not shown) is journaled for limited rotation about a steering axis defined by the main frame 14. The fork 20 is secured to the main frame 14 by a handlebar assembly 22. The reservoir 42 is mounted to the lower fork leg of fork 20 and is in fluid communication with the hydraulic internals of the fork 20. This front suspension embodiment allows the use of the position sensitive shock reservoir 42 with a front wheel suspension system. The reservoir 42 may be capable of angular adjustment relative to the longitudinal axis of the fork 20 to permit adjustment of the sensitivity of an inertia valve 80 incorporated within the reservoir 42.

FIG. 17 illustrates a front wheel suspension system of a bicycle. The illustrated front wheel suspension system uses a telescopic dual leg fork 20. In the illustrated arrangement, the reservoir 42 is mounted inside one of the legs of fork 20 and is in fluid communication with the internal suspension hydraulics of the front wheel suspension. Although this particular embodiment illustrates the reservoir 42 in only one of the fork legs it may be used in both of the fork legs as will be appreciated by one skilled in the art.

FIG. 18 illustrates a front wheel suspension system of a bicycle. The illustrated front wheel suspension system uses telescopic dual leg fork 20. In this arrangement, the reservoir 42 is mounted on the main frame 14 of the bicycle and is in fluid communication with the front suspension system of the telescopic fork 20 by a flexible or semi-rigid tube or hose 41. This configuration allows the reservoir 42 to sense different terrain features experienced by the frame 14 and/or to be protected from potential damage.

Figure 19:
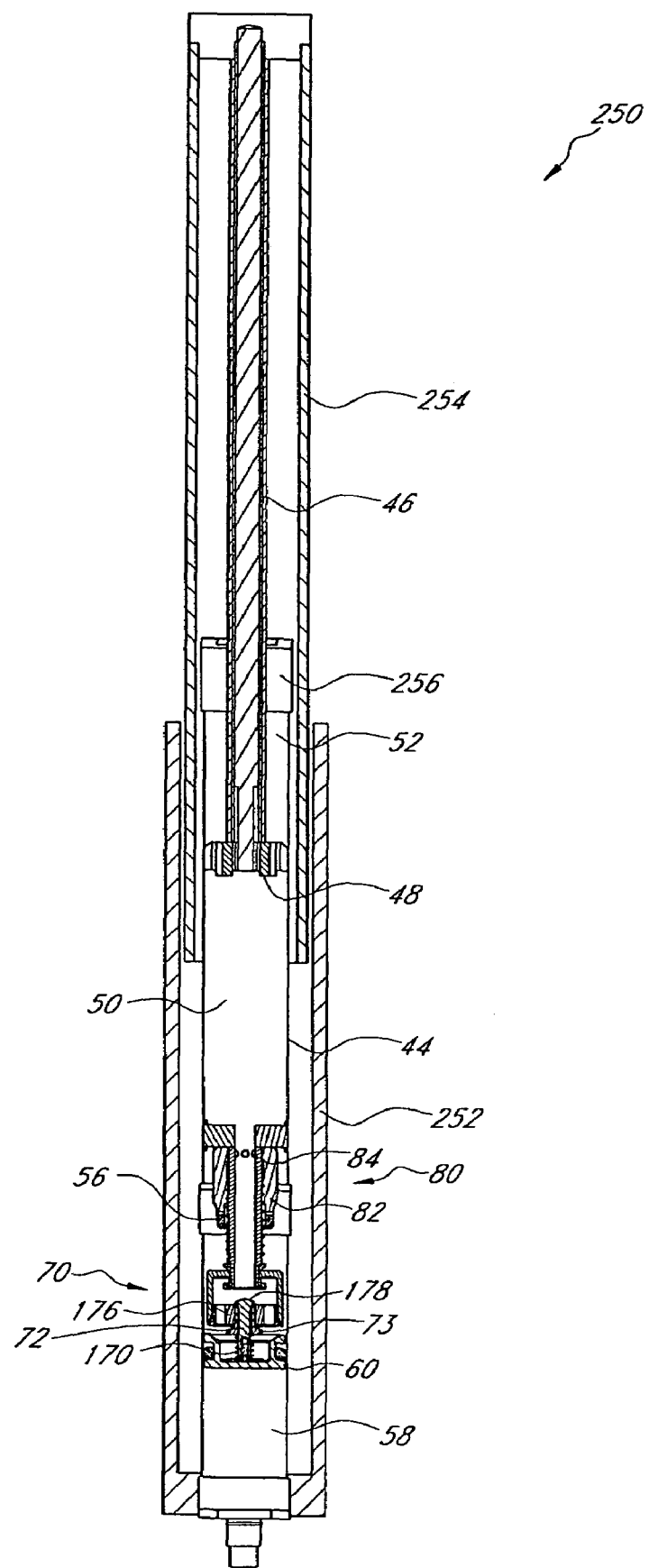
FIG. 19 is a cross-sectional view of a fork leg of a bicycle front wheel suspension system, including certain features, aspects and advantages of the present invention.

FIG. 19 illustrates one fork leg assembly 250 of the front suspension fork 20 of FIG. 1. For convenience similar structures will be referred to by the same reference numerals as used in FIGS. 1-18. The illustrated fork leg assembly 250 includes an outer tube or fork leg 252, and an inner tube or stanchion 254. The fork leg 252 and the stanchion 254 are telescopically engaged with one another for relative movement along a longitudinal axis of the fork leg assembly 250.

The illustrated fork leg assembly 250 includes a damper assembly 256 positioned within an internal space defined by the fork leg 252. The damper assembly 256 preferably is configured to provide a damping force that resists both compression movement and extension (or rebound) movement of the fork leg assembly 250. In addition, preferably the front suspension fork 20 includes a suspension spring (not shown) configured to produce a spring force tending to extend the fork leg assembly 250 and resist compression of the fork leg assembly 250 The suspension spring may be of any suitable construction, such as a coil spring or air spring arrangement, for example.

The damper assembly 256 preferably extends substantially the entire length of the fork leg assembly 250 and is coupled to both the fork leg 252 and the stanchion 254. The damper assembly 256 may be connected to the fork assembly 250 by any suitable connection. The illustrated damper assembly 256 includes a damper tube 44 and a piston rod 46. The piston rod 46 and damper tube 44 are telescopically engaged with one another. As described above, preferably the damper assembly 256 provides a damping force in response to both compression and extension movement.

As illustrated in FIG. 19, the piston rod 46 carries a damping piston 48 on its lower end within the damper tube 44. The damping piston 48 is in a substantially sealed, sliding engagement with an interior surface of the damper tube 44. Thus, the damping piston 48 divides the interior of the damper tube 44 into a first fluid chamber 52 above the damping piston 48 and a second fluid chamber 50 below the damping piston 48. The fluid chamber 50 reduces in volume in response to compression movement of the damper assembly 256 and is often referred to as the compression chamber. Similarly, the fluid chamber 52 reduces in volume in response to extension or rebound movement of the damper assembly 256 and is often referred to as the rebound chamber.

The damper assembly 256 also includes a gas chamber 58 which is configured to compensate for displacement of damping fluid within the damper tube 44 by an increasing volume of the piston rod 46 being present within the damper tube 44 as a result of compression of the damper assembly 256. Thus, as the piston rod 46 occupies an increasing volume of the damper tube 44 upon compression, the gas chamber 58 reduces in volume, thereby increasing the volume of the compression chamber 50 to accommodate fluid that cannot be displaced to the rebound chamber 52.

In the illustrated arrangement, the gas chamber 58 is bordered by a floating piston 60 which separates the compression chamber 50 from a gas chamber 58. The gas within the gas chamber 58 compresses such that the gas chamber 58 is able to reduce in volume to compensate for the damping fluid that cannot be displaced to the rebound chamber 52 during compression of the damper assembly 256. However, other suitable structures may also be employed, such as a bladder, for example.

A position sensitive valve 70 is substantially similar to the position sensitive valve 70 of FIG. 7-15 unless otherwise noted. The position sensitive valve 70 includes a biasing spring 170, a metering rod 72 with an enlarged end 72a, a metering valve 178 and a metering rod sleeve 73. The position sensitive valve 70 is preferably coupled to the center of a blow off piston 176. The position sensitive valve 70 is arranged so that the floating piston 60 will open and close the position sensitive valve 70 at a predetermined position. This position preferably corresponds with the ride height or sag position of the bicycle.

In the specific construction shown in FIG. 19, the fork leg 250 also includes an inertia valve 80, which includes an inertia mass 82 that selectively closes fluid ports 84 to inhibit or prevent fluid flow from the main shock body 40 to the reservoir chamber 56. Thus, when the inertia mass 82 of the inertia valve 80 is in a closed (upward) position, flow to the reservoir chamber 56 preferably is only possible through the position sensitive valve 70.

One advantage to this illustrated construction is that the fork leg 250 will preferably sag to a ride height before the inertia valve 80 takes effect and locks out (or substantially increases the damping force of the damper 256. This prevents the fork leg 250 from being locked out in a fully extended position which may not be the intended ride height of the associated bicycle.

As used herein in connection with a bicycle, the term shock absorber refers to a combination of a damper and suspension spring, as is customary in the industry. However, in other contexts, the term shock absorber may be synonymous with the term damper. A suspension assembly preferably includes a damper and may also include a suspension spring and/or other suspension components, such as linkage members, for example. As will be appreciated by one of skill in the art, the position sensitive valve assembly may be adapted for use in applications where shock absorbers are used other than bicycles, such as motorcycles, snowmobiles or automobiles, for example.

Integrated Suspension and Shifting System

In various embodiments described further below, integrated shifting and suspension systems interconnect a bicycle's shifting with its suspension such that a rider's gear selections will automatically adjust the suspension to complementary firmness settings as well as adjust the bias between the components front to rear. Thus, when a rider selects a relatively low gear, the shifting and suspension interconnection adjusts the suspension to a relatively firm setting. Thus when a rider encounters a steep hill and selects a low gear for climbing, the firm suspension setting increases the rider's pedaling efficiency. When a rider is performing a relatively high speed descent and selects a high gear, the integrated system adjusts the suspension to a soft setting, thus allowing the bicycle to most effectively absorb bumps and dips.

Figure 20:
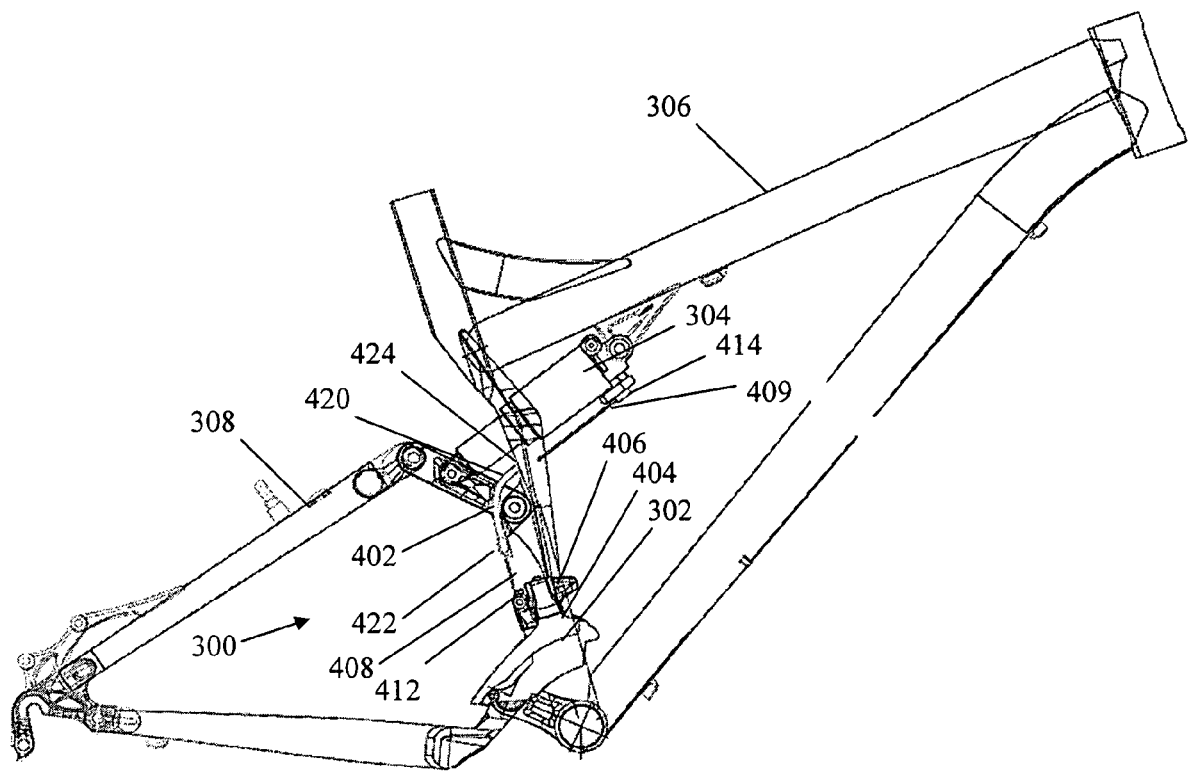
FIG. 20 depicts a side view of a preferred embodiment of integrated shifting and suspension system.
Figure 21:
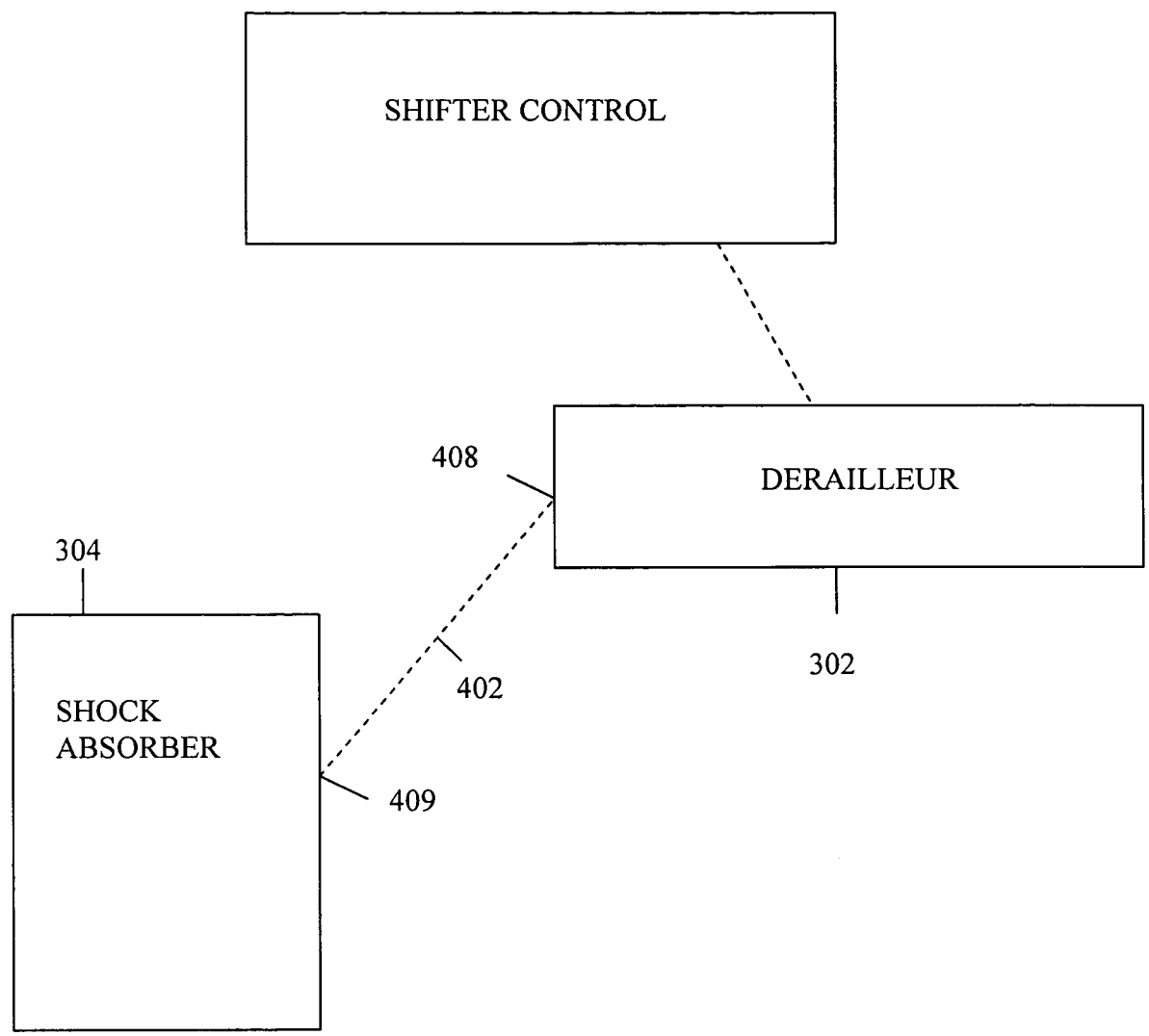
FIG. 21 depicts a schematic view of the integrated system of FIG. 20.

Turning now to FIGS. 20-21, an integrated shifting and suspension system according to one currently preferred embodiment is illustrated. FIG. 20 illustrates a side view of a bicycle frame incorporating an integrated shifting and suspension system 300. The integrated system 300 comprises a derailleur 302 configured to be coupled to a chain drive assembly of a bicycle, and a suspension 304 configured to be connected to first 306 and second 308 parts of the bicycle. FIG. 21 illustrates a schematic view of a connection of a first end of a cable 402 to the derailleur 302.

The integrated system 300 disclosed and illustrated herein as a preferred embodiment includes a mechanical cable linkage coupling a derailleur 302 to a suspension. Advantages of a mechanical integrated system 300 include relatively low weight, low cost manufacture and assembly, ease of use, ease of maintenance, and overall mechanical robustness. However, it is recognized that integrated systems may include hydraulically, pneumatically, or electrically coupled shifting and suspension assemblies and enjoy some of the advantages of the preferred embodiment Derailleur As illustrated in FIG. 20, preferably the derailleur 302 used in various embodiments of the integrated system 300 is a front derailleur 404 of construction known in the art. The front derailleur 404 is preferably pivotally mounted to the bicycle on a pivot arm 406 mechanism that couples the derailleur 302 with the frame of the bicycle. Typically, movement of the pivot arm 406, and thus the front derailleur 404, is selectively controlled by a rider using a handlebar or frame-mounted gear shifter connected to the derailleur 302 by a shifter cable linkage. Movement of the derailleur 302 directs a chain of a chain drive assembly of the bicycle to a specific one of at least one chain rings in the front gear set. While the interconnection of a front derailleur 404 is discussed herein, it is recognized that a rear derailleur could alternately be used in an integrated shifting and suspension system. Alternately, both front and rear derailleurs could be used in an integrated shifting and suspension system.

The front gear set of a bicycle typically has fewer chain rings than the rear gear set, thus the gear position of a front derailleur tends to be more indicative of a type of terrain encountered than does a position of a rear derailleur. In mountain and road bicycles, front gear sets commonly have three chain rings and rear gear sets commonly have from five to nine chain rings. With a three and eight gear layout, the smallest chain ring on the front gear set would be used primarily for climbing hills. The middle chain ring on the front gear set would be for riding at moderate speeds and possibly over moderately difficult terrain. The largest chain ring on the front gear set would be selected for higher speed travel such as rapid descents and level cruising.

In certain embodiments, a first end 408 of a suspension control cable 402 is mounted to the front derailleur 404. Preferably, the cable 402 is mounted to the pivot arm 406 on which the front derailleur 404 is disposed. The cable 402 is mounted such that movement of the front derailleur 404 moves the first end 408 of the cable 402 accordingly. Thus, for a front gear set having three chain rings, the first end 408 of the cable 402 will be in a first position when the front derailleur 404 is in a position corresponding to the selection of the smallest chain ring (corresponding to the lowest gear). Likewise, the first end 408 of the cable 402 will be in a second or third position when the front derailleur 404 is in a position corresponding to selection of the intermediate chain ring or the largest chain ring (corresponding to a middle gear or a high gear), respectively. While detailed discussion has been presented relating to a front derailleur configured for a front gear set having three chain rings, it is recognized that the integrated systems described herein could be used with a derailleur having more or fewer than three gears.

Figure 23A:
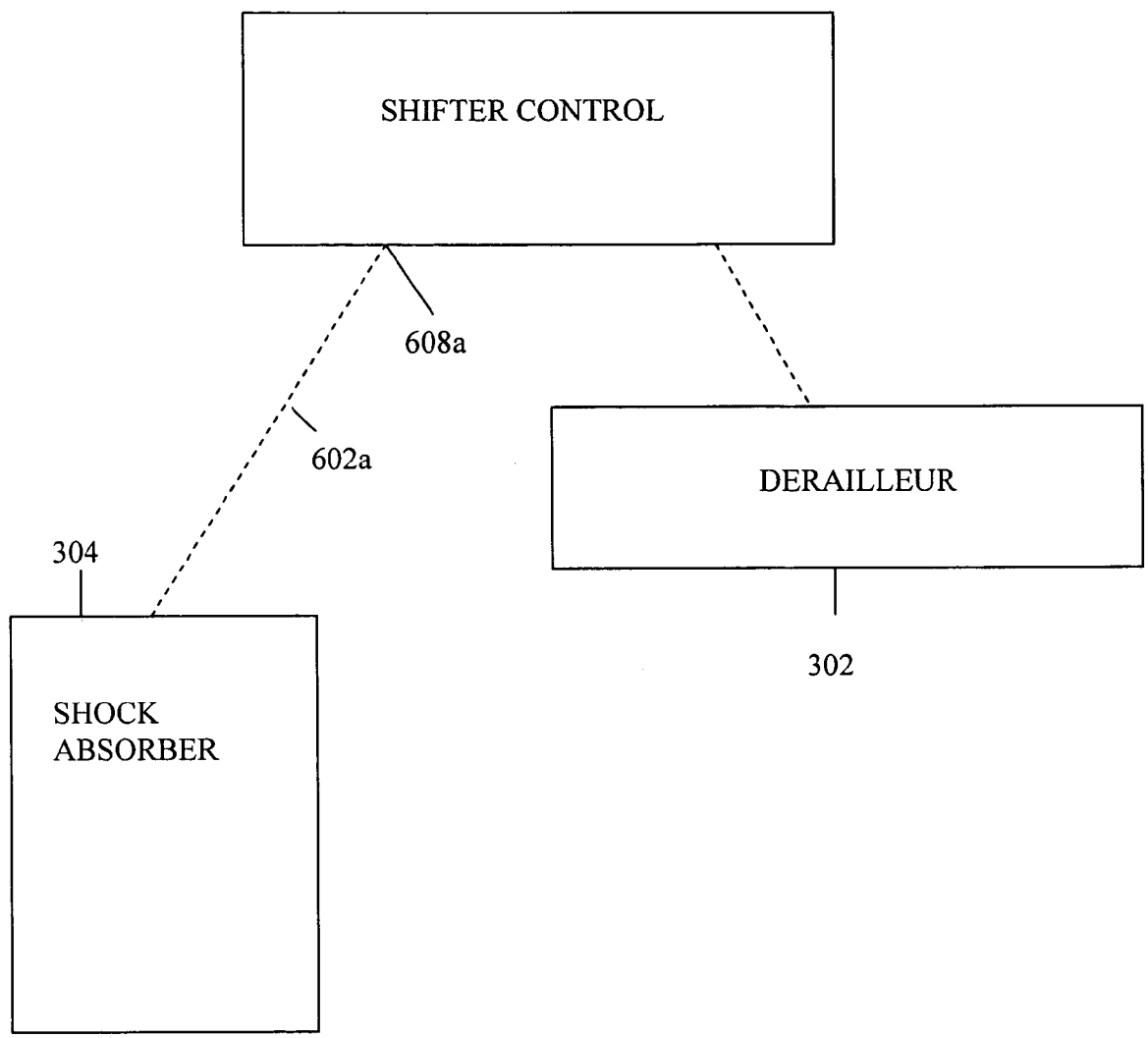
FIG. 23a depicts a schematic view of a second embodiment of an integrated shifting and suspension system.
Figure 23B:
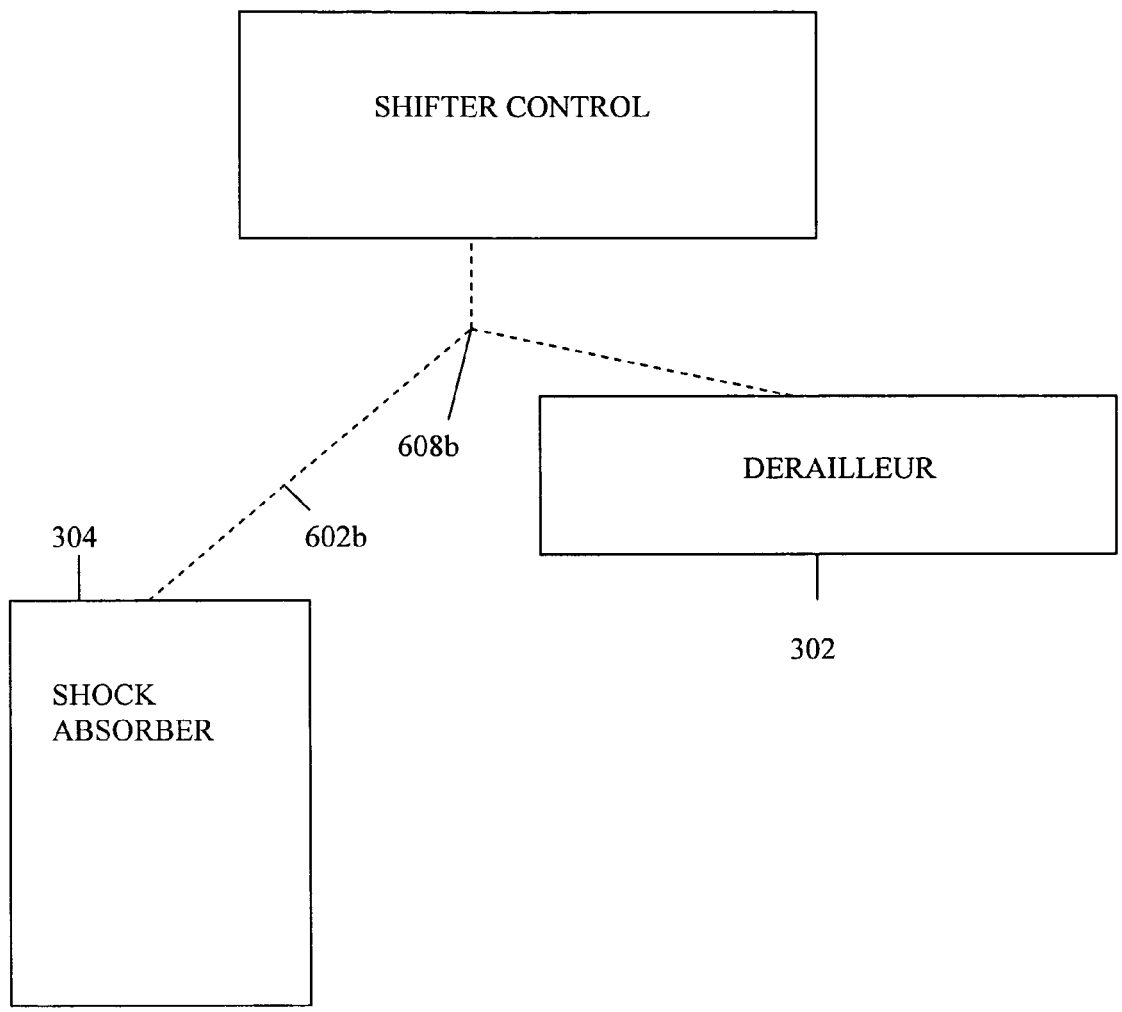
FIG. 23b depicts a schematic view of a third embodiment of an integrated shifting and suspension system.

In certain alternate embodiments, a suspension control cable 602a, 602b is coupled to movement of the derailleur 302 through movement of the shifter cable. As mentioned above, the movement of the derailleur 302 is controlled by a rider using a bicycle-mounted shifter connected to the derailleur 302 with a shifter cable. Movement of the suspension control cable may be coupled to movement of the shifter cable in a variety of ways, two of which are depicted in FIGS. 23a and 23b. In FIG. 23a, a first end 608a of the suspension control cable 602a is directly connected to the shifter. Thus movement of the shifter directly actuates both the shifter cable to move the derailleur 302 and the suspension control cable 602a. The shifter may be a thumb-actuated button shift, a rotating grip shift, a lever shift, or another bicycle gear selection mechanism known in the art. However, it is recognized that in certain instances it may not be desirable to route an additional cable to the hand controls of a bicycle as there are typically already two brake control cables and two shifter control cables in close proximity near the handlebars.

In FIG. 23b a second alternate embodiment of an integrated suspension and shifting system is illustrated. In this embodiment, a first end 608b of the suspension control cable 602b is coupled to the shifter cable at a location on the shifter cable between the shifter control and the derailleur 302. Thus, movement of the shifter cable in response to input from a rider correspondingly moves a first end 608b of the suspension control cable 602b. The connection between the first end 608b of the suspension control cable 602b and the shifter cable may be made via cable splice, cable splitter, crimped connection, or other suitable cable connection. An advantage of this embodiment is that it does not route the suspension control cable 602b to the hand control area of the bicycle where other cables are typically present.

Suspension

In various embodiments of the integrated shifting and suspension systems, the suspension 304 is an adjustable tubular rear gas shock absorber. Various adjustable shock absorbers are known in the art and are commonly commercially available. One common adjustable shock absorber features three firmness settings: a firm, essentially locked out setting, an intermediate firmness setting, and a soft setting. Conventionally, the shock absorber may be adjusted by actuating a lever on the shock absorber. Advantageously, a shock absorber with three firmness settings may be easily integrated with a front derailleur 404 having three chain rings, as it is desirable to have a firm suspension setting when a low gear is selected (for increased pedaling efficiency during hill climbing), an intermediate firmness setting when a low gear is selected (for absorption and dissipation of moderate bumps), and a soft firmness setting when a high gear is selected (for maximum shock absorption while making a descent or cruising). However, it is recognized that a shock absorber having more or fewer than three firmness settings, or a shock absorber having continuously variable firmness may also be coupled to a derailleur 302 in an integrated shifting and suspension system.

In other embodiments, the shock absorber can have adjustable rebound damping in addition to or instead of adjustable firmness. As with shock absorbers having adjustable firmness, a shock absorber with three adjustable rebound settings can be easily integrated with a front derailleur 404 having three chain rings. In these embodiments, the shock absorber can be integrated with a front derailleur 404 having three chain rings such that the shock absorber has relatively slow rebound when a low gear is selected (for slower land speeds), intermediate rebound speeds when the middle gear is selected, and relatively faster rebound speeds when a higher gear is selected (for quicker land speeds). In other embodiments, a shock absorber having more or fewer than three rebound damping settings, or a shock absorber having continuously variable rebound characteristics can also be coupled to a derailleur 302 in an integrated shifting and suspension system.

Figure 22A:
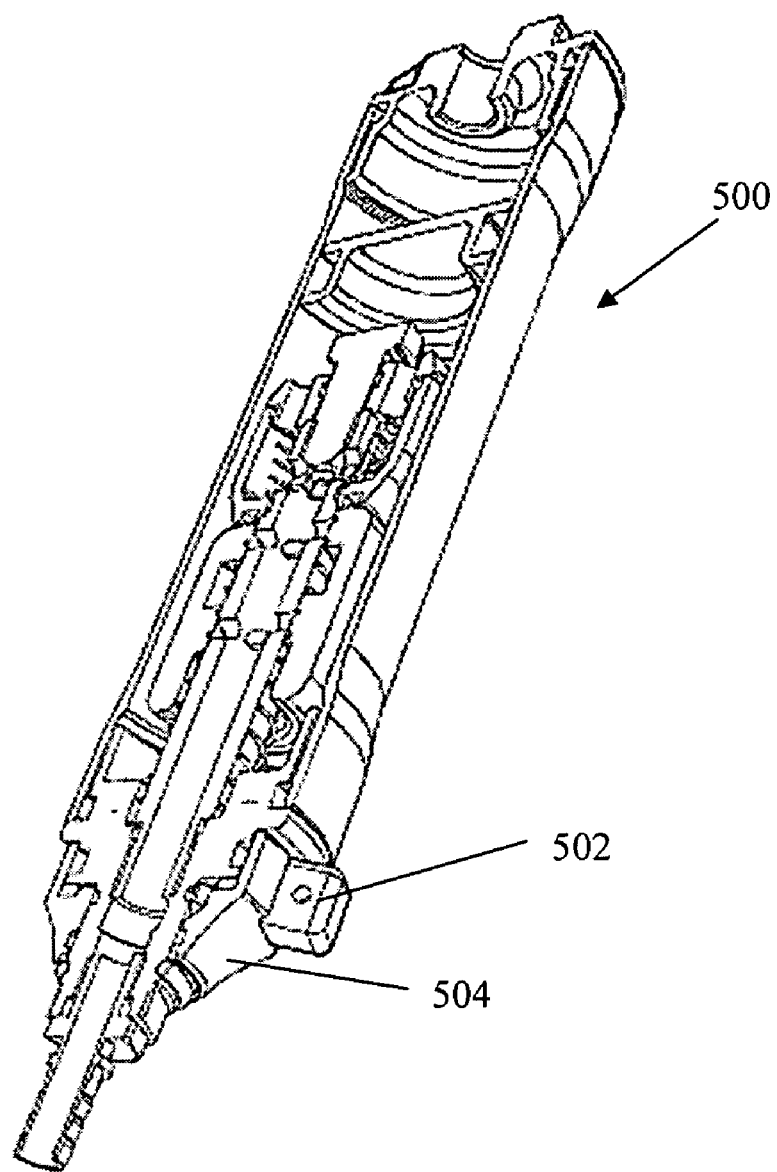
FIG. 22a depicts a cut-away perspective view of a valve for adjusting a shock absorber shock absorber of the integrated system of FIG. 20.
Figure 22B:
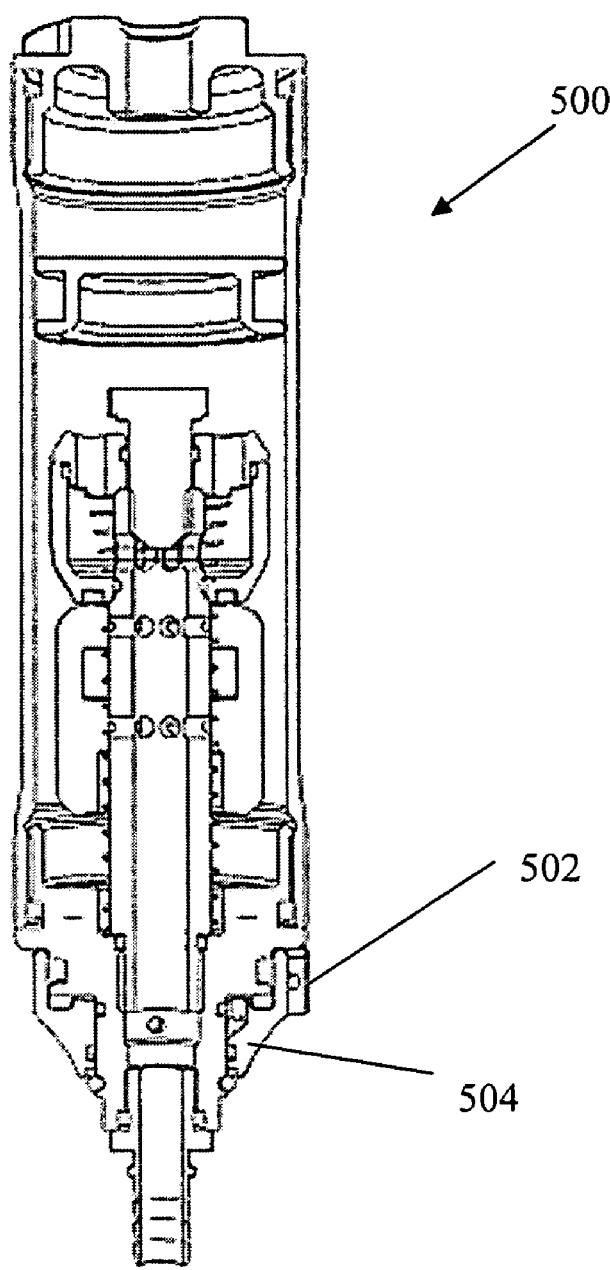

As depicted in FIGS. 20, 22a, and 22b, an adjustable tubular shock absorber is configured to be coupled to a derailleur 302 by a cable 402. A second end 409 of the cable 402 is connected to a cable mount 502 on a valve 500 for adjusting the firmness characteristics of a shock absorber. The cable mount 502 is disposed on a rotating compression adjustment valve 504. Movement of the cable 402 rotates the compression adjustment valve 504 to adjust the firmness setting of the suspension. The configuration and operation of the valve 500 and its use in conjunction with a bicycle suspension is further discussed above with respect to FIGS. 1-19 above. In general, a rotating shaft blocks a port that communicates between the main body of the shock and the auxiliary reservoir. This rotating shaft would be hollow down the center with radial holes piecing the sides of the "barrel." These holes vary in size so as the shaft rotates a different size hole would govern the flow rate form the main body to the reservoir thus varying the rate of damping produced by the shock for a given shaft velocity.

While the illustrated embodiments of the integrated system 300 include a tubular shock absorber, it is recognized that other types of adjustable suspensions could be used in an integrated system 300 as discussed herein. Likewise, while the illustrated embodiments of the integrated system 300 depict control of a rear suspension, the integrated systems described herein could be used to control a front suspension or simultaneously control both a front and rear suspension.

Cable

As depicted in FIGS. 20-22, a cable 402 mechanically couples a derailleur 302 and a suspension 304 of a bicycle. This suspension control cable 402 may comprise a standard metal cable as are used for shifting and braking mechanisms of a bicycle. The cable 402 may comprise an inner cable 410 running inside an outer sheath 420. The inner cable 410 is axially movable with respect to the sheath 420. While in the illustrated embodiments, a cable linkage is illustrated as connecting a derailleur 302 with a suspension 304 of a bicycle, it is recognized that other mechanical linkages such as, but not limited to, pushrods or pivotally connected links could be used in the place of cables in an integrated system as described herein. Therefore, uses of these components in an integrated system are considered within the scope of certain embodiments of the present invention.

As depicted in FIGS. 20-22, a first end 408 of the cable 402 is connected to a derailleur 302. Preferably, as further illustrated in FIG. 20, a first end 412 of the inner cable 410 is coupled to a location on a pivot arm 406 of the derailleur 302 and a first end 422 of the outer sheath 420 is mounted to a location on the bicycle frame adjacent the pivot arm 406 of the derailleur 302 such that movement of the derailleur 302 moves the inner cable 410 with respect to the outer sheath 420.

The cable 402 is routed along the frame from the first end 422 of the outer sheath 420 adjacent to the pivot arm 406 of the derailleur 302 to a second end 424 of the outer sheath 420 adjacent an adjustment spool of a shock absorber. Cable mounting and routing techniques and devices known in the art may be used to route the cable 402 clear of moving parts of the bicycle. As illustrated in FIGS. 20, 22a, and 22b, a second end 424 of the outer sheath 420 is mounted to the frame of the bicycle adjacent an adjustment spool on the shock absorber. A second end 414 of the inner cable 410 is mounted to the adjustment spool on the shock absorber such that movement of the inner cable 410 relative to the outer sheath 420 moves the adjustment spool on the shock absorber, thus selecting a firmness setting of the shock absorber.

Operation of the Illustrated Embodiments

In operation, the embodiments of integrated system 300 illustrated in FIGS. 20-22 couple a bicycle transmission to a bicycle suspension 304 such that the selection of a low gear results in adjustment of a suspension setting to firm. Likewise, selection of a high gear results in adjustment of a suspension setting to soft setting. When a rider selects a low gear by adjusting a front derailleur shifter to direct the chain onto the smallest gear ring, movement of the front derailleur 404 into a position corresponding to the low gear selection moves a first end 412 of an inner cable 410 relative to an outer sheath 420 of the cable 402. This movement of the first end 412 of the inner cable 410 correspondingly moves the second end 414 of the inner cable 410 relative to the outer sheath 420. The second end 414 of the inner cable 410 is coupled to an adjustment spool on an adjustment mechanism of a rear shock absorber, and, moves the adjustment spool into a position corresponding to a firm suspension setting. The selection of middle or higher gears by a rider selecting an intermediate or large chain ring position on the front derailleur 404 likewise moves a first end 412 of the inner cable 410 with respect to the outer sheath 420, resulting in movement of the second end 414 of the inner cable 410 and rotation of the adjustment spool of the adjustment mechanism of the shock absorber. Thus, the suspension 304 and shifting of a bicycle are coupled to advantageously automatically select a suspension setting that corresponds to the terrain and topography indicated by a rider's gear selection.

Integrating Shifting with Adjustable Attitude

Figure 24:
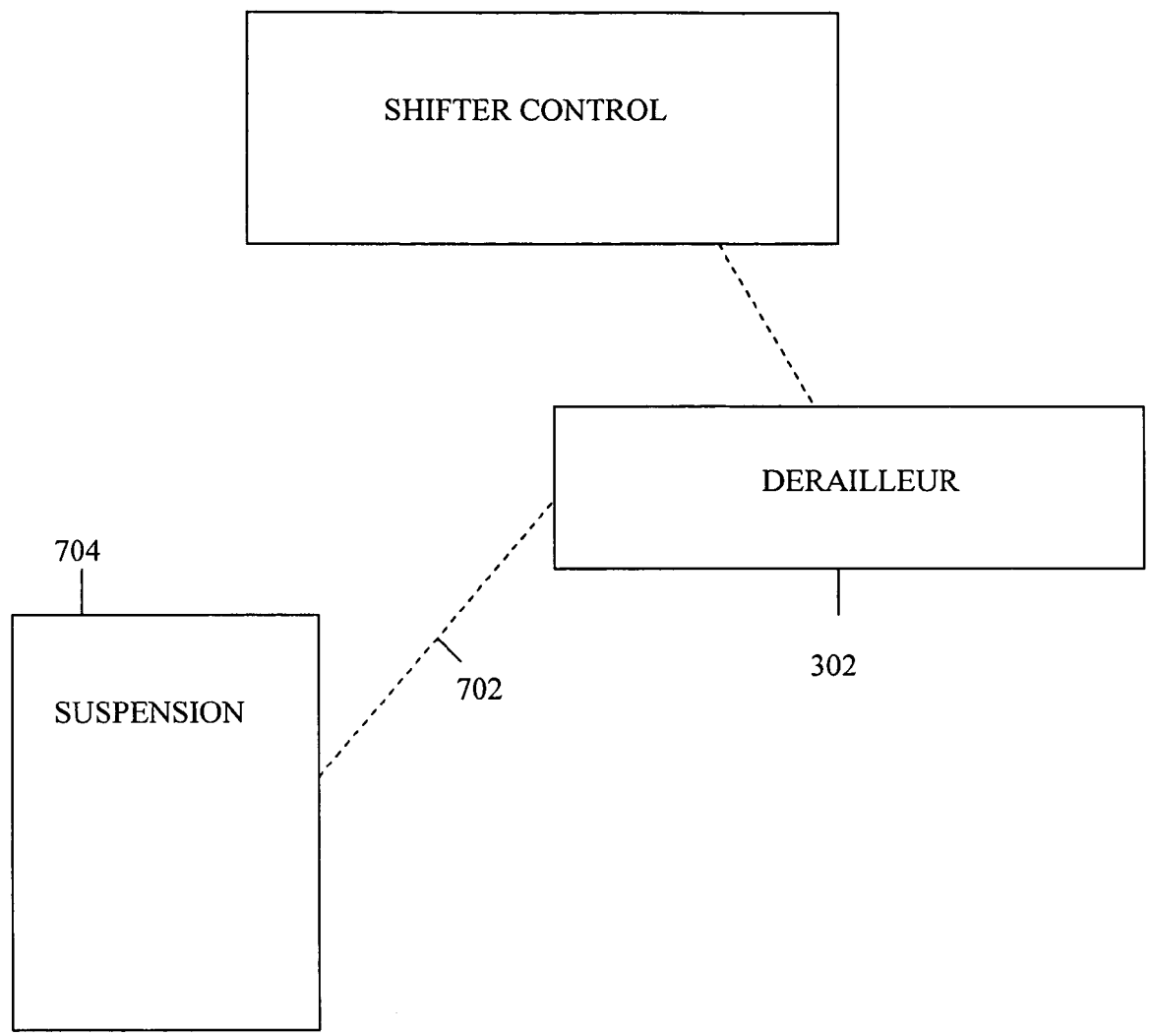
FIG. 24 depicts a schematic view of an integrated shifting and attitude control system.

In other embodiments, as depicted schematically in FIG. 24, shifting may be integrated with an attitude adjustment of a suspension. It is recognized that certain chassis attitudes may be preferable for certain riding events. The attitude of a bicycle refers to a orientation of the bicycle frame relative to the direction of motion. The attitude of a bicycle may be adjusted on a bicycle with a front, rear, or front and rear suspension by limiting or expanding the amount of travel of the front or rear suspension to raise or lower a respective end of the bicycle. For example, it is desirable that the front fork be at a lower position and/or the rear suspension be raised for steep climbs. It may also be desirable to raise the front fork and/or lower the rear suspension for a descent. Such attitude adjustments relocate the center of gravity of the bicycle to enhance the stability and ridability of the bicycle. Since as discussed above a lower gear selection (corresponding to a selection of a small chain ring by the front derailleur) is desirable in steep climb events, an integrated system as described above with reference to adjusting a suspension firmness setting may be used to adjust a suspension attitude setting. An attitude adjustment cable 702 can provide interconnection between a suspension 704 of a bicycle having an adjustable attitude and a derailleur 302. The cable is configured to adjust the attitude setting of the suspension responsive to movement of the derailleur. In other embodiments, the derailleur 302 and suspension 704 can be electronically coupled, such as with an electronically controlled actuator such that a movement of the derailleur actuates a corresponding adjustment of the attitude on the suspension. It is recognized that in various embodiments, such integrated systems could be applied to interconnect a derailleur with front, rear, or both front and rear suspensions. Likewise, the attitude adjustment cable could be coupled to the derailleur, to the shifter control mechanism, or to the shifter cable.

Integrating Braking Systems with Suspension

Figure 25:
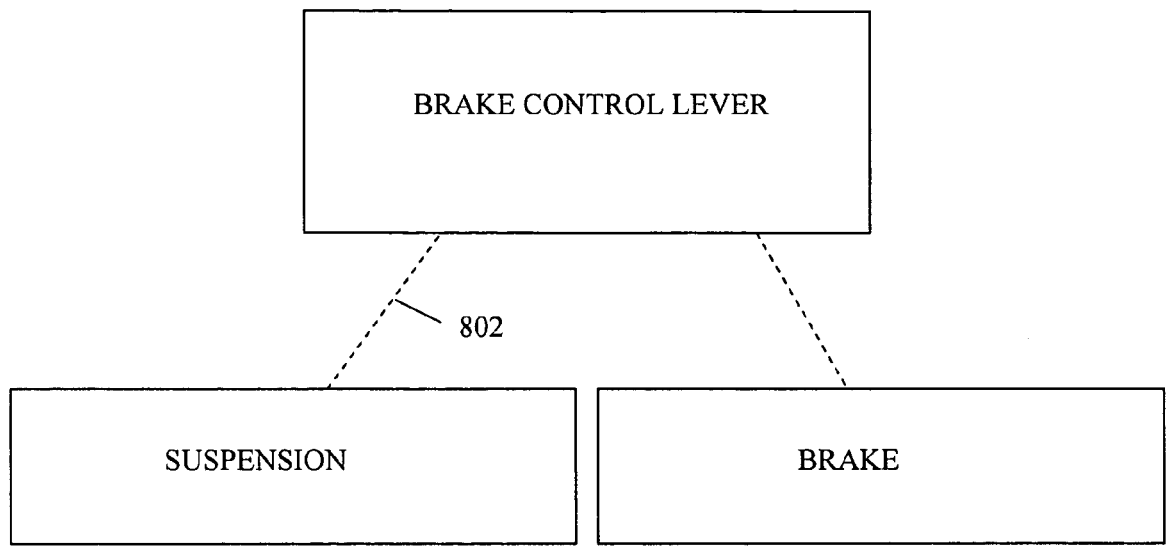
FIG. 25 depicts a schematic view of an integrated braking and suspension system.

In certain embodiments, as schematically illustrated in FIG. 25, a bicycle's braking system could be integrated with the suspension setting. It is recognized that a rider does not typically brake and pedal simultaneously. Therefore, pedaling efficiency is not a concern under braking. A suspension control cable 802 could therefore interconnect a braking system of a bicycle with a firmness adjustment or a rebound damping adjustment of a bicycle such that when a brake lever is actuated, a suspension is set to a soft firmness setting to provide enhanced shock absorption. This integrated braking system could interconnect either front or rear brakes with front or rear suspensions. Furthermore, the integrated braking and suspension system could be configured such that the suspension control cable adjusts the suspension to a firm setting upon initial pulling of the brake control lever, but before the brakes are engaged. With such a configuration, a rider can selectively adjust the bicycle suspension without applying the brakes. In some embodiments, the brakes and suspension can be electronically coupled, such as with an electronically controlled actuator such that a movement of the derailleur actuates a corresponding adjustment of the attitude on the suspension.

The above presents a description of the best mode contemplated for carrying out the present integrated shifting and suspension system, and of the manner and process of making and using it, in such full, clear, concise, and exact terms as to enable any person skilled in the art to which it pertains to make and use this integrated system. This integrated system is, however, susceptible to modifications and alternate constructions from that discussed above that are fully equivalent. Consequently, this integrated system is not limited to the particular embodiments disclosed. On the contrary, this integrated system covers all modifications and alternate constructions coming within the spirit and scope of the integrated system as generally expressed by the following claims, which particularly point out and distinctly claim the subject matter of the integrated system.

What is claimed is:

1. A bicycle suspension control system comprising:
a derailleur coupled to a chain drive assembly of a bicycle;
a suspension connected to first and second parts of the bicycle, said suspension being selectively controllable;
wherein the derailleur and suspension are operatively coupled such that movement of the derailleur causes adjustment of the suspension such that when the derailleur is in a position corresponding to a low gear on the chain drive assembly, the suspension is adjusted to a first configuration and when the derailleur is in a position corresponding to a high gear on the chain drive assembly, the suspension is adjusted to a second configuration.

2. A bicycle suspension control system comprising:
a derailleur configured to be coupled to a chain drive assembly of a bicycle,
a suspension configured to be connected to first and second parts of the bicycle, said suspension being selectively controllable;
wherein movement of the derailleur causes adjustment of the suspension such that when the derailleur is in a position corresponding to a low gear on the chain drive assembly, the suspension is adjusted to a first configuration and when the derailleur is in a position corresponding to a high gear on the chain drive assembly, the suspension is adjusted to a second configuration; and
wherein the derailleur is mechanically coupled to the suspension such that when the derailleur is in a position corresponding to a low gear on the chain drive assembly, the suspension is adjusted to a first configuration and when the derailleur is in a position corresponding to a high gear on the chain drive assembly, the suspension is adjusted to a second configuration.

3. The bicycle suspension control system of claim 2, further comprising a cable operatively coupling the derailleur to the suspension such that when the derailleur is in a position corresponding to a low gear on the chain drive assembly, the suspension is adjusted to a first configuration, and when the derailleur is in a position corresponding to a high gear on the chain drive assembly, the suspension is adjusted to a second configuration.

4. The bicycle suspension control system of claim 1, wherein the derailleur is a front derailleur of the bicycle.

5. The bicycle suspension control system of claim 4, wherein the front derailleur is configured to select a chain ring on a chain drive assembly having a front gear assembly with three chain rings.

6. The bicycle suspension control system of claim 5, wherein the suspension comprises a gas tube shock absorber.

7. The bicycle suspension control system of claim 5, wherein the suspension is selectively adjustable between a first firmness setting, a second firmness setting, and a third firmness setting.

8. The bicycle suspension control system of claim 7, wherein the front derailleur and the suspension are operatively coupled such that a front derailleur position corresponding to selection of a first chain ring on the front gear assembly adjusts the suspension to the first firmness setting, a front derailleur position corresponding to selection of a second chain ring on the front gear assembly adjusts the suspension to the second firmness setting, and a front derailleur position corresponding to selection of a third chain ring on the front gear assembly adjusts the suspension to the third firmness setting.

9. The bicycle suspension control system of claim 5, wherein the suspension is selectively adjustable between a first rebound damping setting, a second rebound damping setting, and a third rebound damping setting.

10. The bicycle suspension control system of claim 9, wherein the front derailleur and the suspension are operatively coupled such that a front derailleur position corresponding to selection of a first chain ring on the front gear assembly adjusts the suspension to the first rebound damping setting, a front derailleur position corresponding to selection of a second chain ring on the front gear assembly adjusts the suspension to the second rebound damping setting, and a front derailleur position corresponding to selection of a third chain ring on the front gear assembly adjusts the suspension to the third rebound damping setting.

11. The bicycle suspension control system of claim 3, wherein the cable comprises an inner cable and an outer sheath.

12. The bicycle suspension control system of claim 11, the cable having a first end and a second end;
wherein the first end of the inner cable is coupled to a pivot arm of the derailleur and the first end of the outer sheath is configured to be coupled to a cable stop on a frame of the bicycle at a location adjacent the derailleur; and
wherein the second end of the inner cable is coupled to a firmness control mechanism of the suspension.

13. The bicycle suspension control system of claim 12, wherein the suspension comprises an adjustable shock absorber, wherein the firmness control mechanism comprises a spool affixed to a rotatable shaft coupled to the shock absorber such that rotation of the rotatable shaft adjusts the firmness of the shock absorber.

14. The bicycle suspension control system of claim 13, wherein the spool is biased to a first position corresponding to a firm setting of the shock absorber.

15. A bicycle suspension control system comprising:
a cable having a first end and a second end;
wherein the first end of the cable is coupled to a derailleur of a bicycle having a chain drive assembly such that varying a gear selection of the derailleur varies the position of the first end of the cable; and
wherein the second end of the cable is coupled to an adjustable suspension such that varying the position of the second end of the cable adjusts the adjustable suspension.

16. The bicycle suspension control system of claim 15, wherein the cable comprises an inner cable and an outer sheath, wherein the inner cable extends axially through the outer sheath.

17. The bicycle suspension control system of claim 16, wherein the first end of the inner cable is configured to be coupled to a pivot arm on the derailleur and the first end of the outer sheath is configured to be coupled to a location on a frame of the bicycle adjacent the swing arm on the derailleur such that movement of the derailleur displaces the inner cable relative to the outer sheath.

18. The bicycle suspension control system of claim 16, wherein the first end of the inner cable is configured to be coupled to a gear selection control, the gear selection control being coupled to the derailleur.

19. The bicycle suspension control system of claim 16, wherein the first end of the inner cable is configured to be coupled to a shifter cable, the shifter cable coupling a gear selection control to the derailleur.

20. The bicycle suspension control system of claim 16, wherein the second end of the inner cable is configured to be coupled to a firmness control mechanism on the suspension and the second end of the outer sheath is configured to be coupled to a location on the frame adjacent the firmness control mechanism such that movement of the inner cable relative to the outer sheath actuates the firmness control mechanism.

21. The bicycle suspension control system of claim 16, wherein the adjustable suspension comprises an adjustable shock absorber, wherein the firmness control mechanism comprises a spool affixed to a rotatable shaft coupled to the shock absorber such that rotation of the rotatable shaft adjusts the firmness of the shock absorber.

22. A bicycle attitude control system comprising:
at least one of a derailleur and a gear shifting mechanism configured to be coupled to a chain drive assembly of a bicycle;
a suspension configured to be connected to first and second parts of the bicycle, said suspension having a selectively controllable travel corresponding to an attitude of the bicycle;
wherein the at least one of a derailleur and a gear shifting mechanism is mechanically coupled to the suspension such that when the at least one of a derailleur and a gear shifting mechanism is in a position corresponding to a low gear on the chain drive assembly, the suspension is adjusted such that the bicycle is at a first attitude and when the at least one of a derailleur and a gear shifting mechanism is in a position corresponding to a high gear on the chain drive assembly, the suspension is adjusted such that the bicycle is at a second attitude.

23. The bicycle attitude control system of claim 22, wherein the suspension comprises a rear suspension.

24. The bicycle attitude control system of claim 22, wherein the suspension comprises a front suspension.

25. The bicycle attitude control system of claim 23, further comprising a front suspension, wherein the front suspension has a selectively controllable travel corresponding to an attitude of the bicycle, and wherein the at least one of a derailleur and a gear shifting mechanism is operatively coupled to the front suspension such that when the at least one of a derailleur and a gear shifting mechanism is in a position corresponding to a low gear on the chain drive assembly, the suspension is adjusted such that the bicycle is at a first attitude and when the at least one of a derailleur and a gear shifting mechanism is in a position corresponding to a high gear on the chain drive assembly, the suspension is adjusted such that the bicycle is at a second attitude.

* * * * *